US012651907B2

(12) United States Patent　　(10) Patent No.:　US 12,651,907 B2
Iwasaki et al.　　　　　　　　　(45) Date of Patent:　　　Jun. 9, 2026

(54) VEHICLE ALLOCATION INFORMATION OUTPUT APPARATUS, VEHICLE ALLOCATION INFORMATION OUTPUT METHOD, AND RECORDING MEDIUM

(71) Applicant: NEC Corporation, Tokyo (JP)

(72) Inventors: Makoto Iwasaki, Tokyo (JP); Masaru Yanai, Tokyo (JP); Kosei Kobayashi, Tokyo (JP); Hideki Muramatsu, Tokyo (JP); Motoharu Ohtake, Tokyo (JP); Noritsugu Yamanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 390 days.

(21) Appl. No.: 18/511,085

(22) Filed: Nov. 16, 2023

(65) Prior Publication Data

US 2024/0178669 A1　　May 30, 2024

(30) Foreign Application Priority Data

Nov. 25, 2022　(JP) ................................. 2022-188042

(51) Int. Cl.
　　*H02J 3/32*　　　(2026.01)
　　*G08G 1/00*　　　(2006.01)
(52) U.S. Cl.
　　CPC .............. *H02J 3/322* (2020.01); *G08G 1/202* (2013.01)
(58) Field of Classification Search
　　CPC ................................. H02J 3/322; G08G 1/202
　　See application file for complete search history.

(56) References Cited

U.S. PATENT DOCUMENTS

| | | | |
|---|---|---|---|
| 2012/0109409 A1* | 5/2012 | Hara ...................... | B60L 53/16 701/1 |
| 2015/0061592 A1* | 3/2015 | Nakasone ............... | B60L 53/14 320/109 |
| 2015/0226567 A1* | 8/2015 | North ................. | G01C 21/3469 701/533 |
| 2017/0043671 A1* | 2/2017 | Campbell ............ | G08G 1/0129 |
| 2019/0113354 A1* | 4/2019 | Matsumura ........ | G01C 21/3469 |
| 2019/0212186 A1* | 7/2019 | Warren ................... | G10L 25/51 |

(Continued)

FOREIGN PATENT DOCUMENTS

| | | |
|---|---|---|
| JP | 2012-168073 A | 9/2012 |
| JP | 2020-114051 A | 7/2020 |
| JP | 2021-144590 A | 9/2021 |

*Primary Examiner* — Ziaul Karim

(74) *Attorney, Agent, or Firm* — Sughrue Mion, PLLC

(57)　　　　　　　　ABSTRACT

A vehicle allocation information output apparatus relates to a vehicle capable of supplying electric power to an electric power supply destination, and outputs vehicle allocation information being information relating to the vehicle to be allocated to the electric power supply destination, the apparatus retrieving a route from a current location of the vehicle to the electric power supply destination, calculating a suppliable electric power amount of the vehicle on arrival at the electric power supply destination for the route being retrieved, and outputting information relating to a vehicle allocation pattern in which a consumption electric power amount is minimized as the vehicle allocation information, the vehicle allocation pattern being a vehicle allocation pattern in which a total amount of the suppliable electric power amount of the vehicle to be allocated is equal to or greater than a required electric power amount being required at the electric power supply destination.

13 Claims, 15 Drawing Sheets

(56)             References Cited

U.S. PATENT DOCUMENTS

| | | | |
|---|---|---|---|
| 2019/0291596 A1* | 9/2019 | Hase | B60L 53/12 |
| 2019/0351783 A1* | 11/2019 | Goei | G08G 1/202 |
| 2020/0262306 A1* | 8/2020 | Tomita | B60L 53/63 |
| 2020/0384886 A1* | 12/2020 | Namiki | G06N 3/02 |
| 2021/0021132 A1* | 1/2021 | Tsuji | H02J 3/381 |
| 2021/0114583 A1* | 4/2021 | Flores Aviña | G01C 21/26 |
| 2021/0206107 A1* | 7/2021 | Ulichney | B29C 64/393 |
| 2021/0300325 A1* | 9/2021 | Kawai | B60W 20/13 |
| 2022/0048400 A1* | 2/2022 | Sumi | B60L 53/665 |
| 2022/0149670 A1* | 5/2022 | Umeno | H02J 50/20 |

* cited by examiner

Fig.1

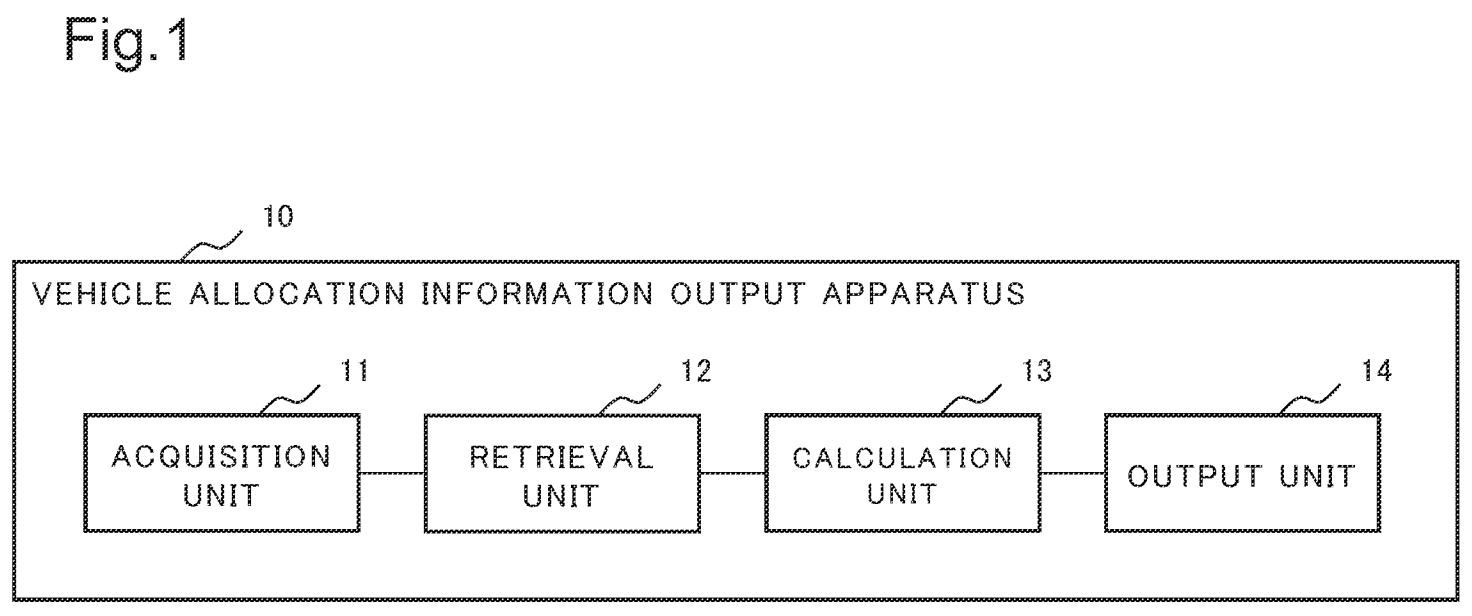

VEHICLE ALLOCATION INFORMATION OUTPUT APPARATUS

10

11

ACQUISITION UNIT

12

RETRIEVAL UNIT

13

CALCULATION UNIT

14

OUTPUT UNIT

Fig.3

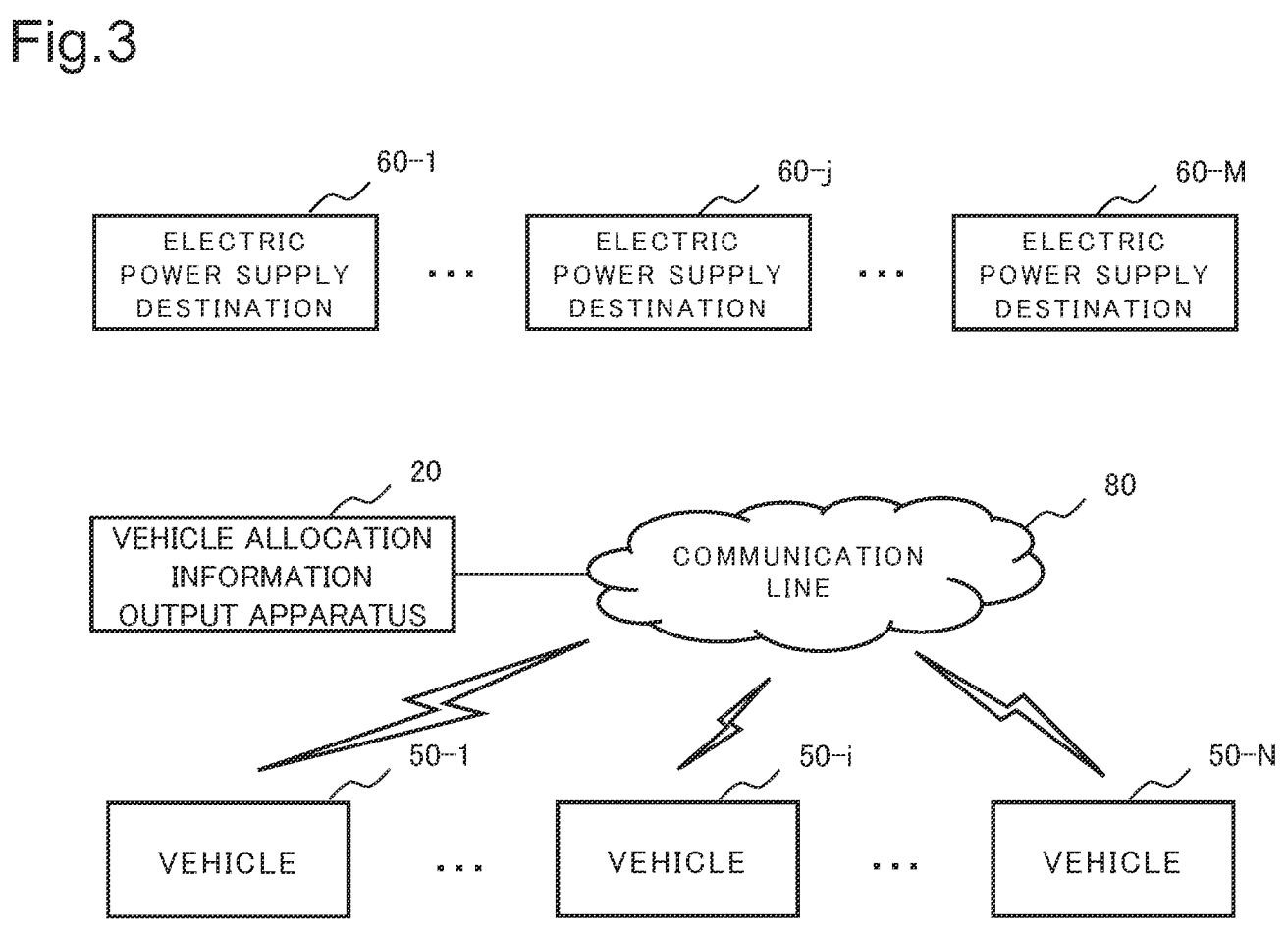

ELECTRIC POWER SUPPLY DESTINATION  60-1

ELECTRIC POWER SUPPLY DESTINATION  60-j

ELECTRIC POWER SUPPLY DESTINATION  60-M

COMMUNICATION LINE  80

VEHICLE ALLOCATION INFORMATION OUTPUT APPARATUS  20

VEHICLE  50-1

VEHICLE  50-i

VEHICLE  50-N

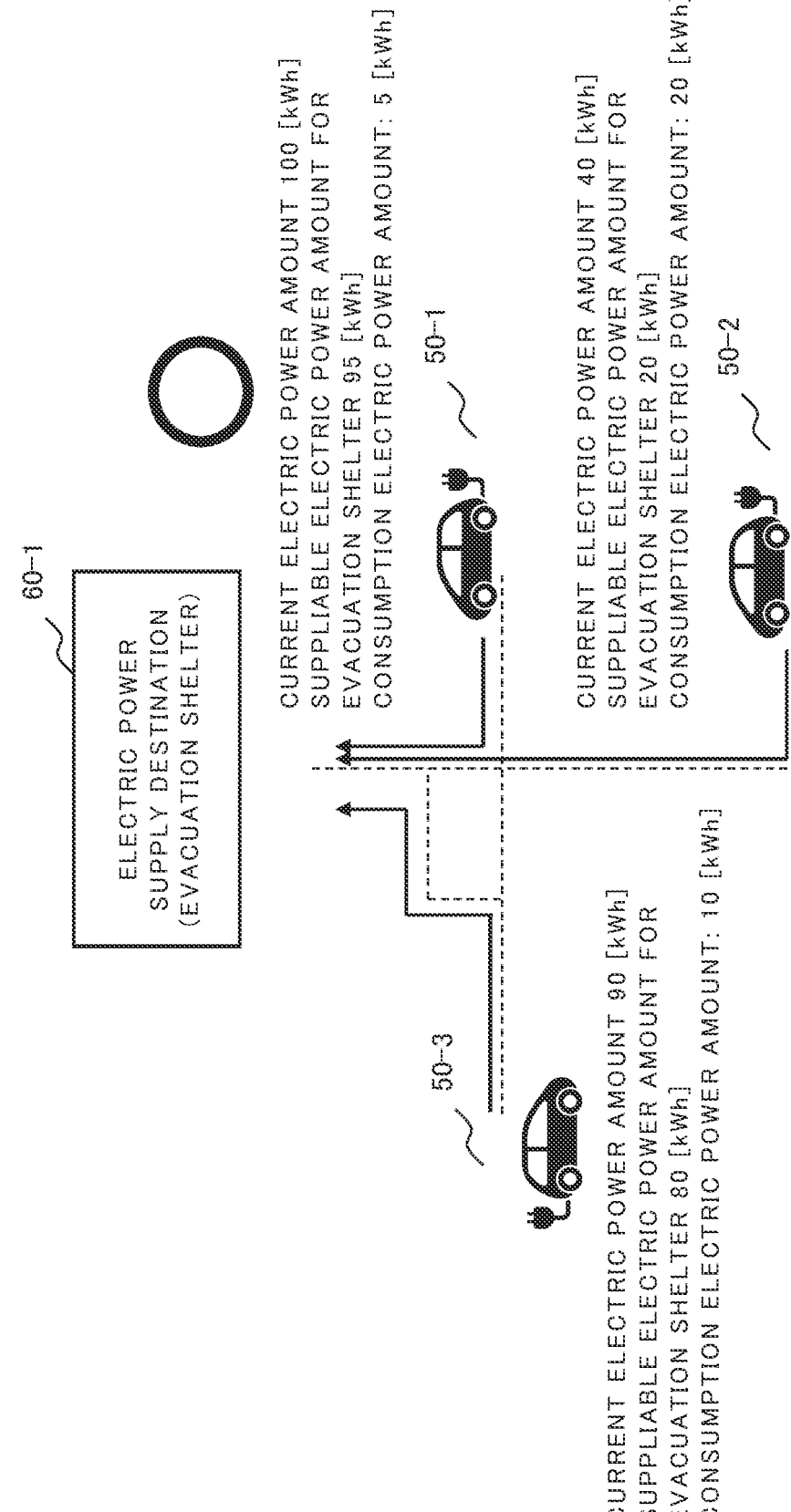

REQUIRED ELECTRIC POWER AMOUNT 70 [kWh]

60-1

ELECTRIC POWER SUPPLY DESTINATION (EVACUATION SHELTER)

CURRENT ELECTRIC POWER AMOUNT 100 [kWh]
SUPPLIABLE ELECTRIC POWER AMOUNT FOR
EVACUATION SHELTER 95 [kWh]
CONSUMPTION ELECTRIC POWER AMOUNT: 5 [kWh]

50-1

CURRENT ELECTRIC POWER AMOUNT 40 [kWh]
SUPPLIABLE ELECTRIC POWER AMOUNT FOR
EVACUATION SHELTER 20 [kWh]
CONSUMPTION ELECTRIC POWER AMOUNT: 20 [kWh]

50-2

50-3

CURRENT ELECTRIC POWER AMOUNT 90 [kWh]
SUPPLIABLE ELECTRIC POWER AMOUNT FOR
EVACUATION SHELTER 80 [kWh]
CONSUMPTION ELECTRIC POWER AMOUNT: 10 [kWh]

Fig.7

| ELECTRIC POWER SUPPLY DESTINATION ID | VEHICLE ID |
|---|---|
| ELECTRIC POWER SUPPLY DESTINATION 60-1 | VEHICLE 50-1 |

Fig.8

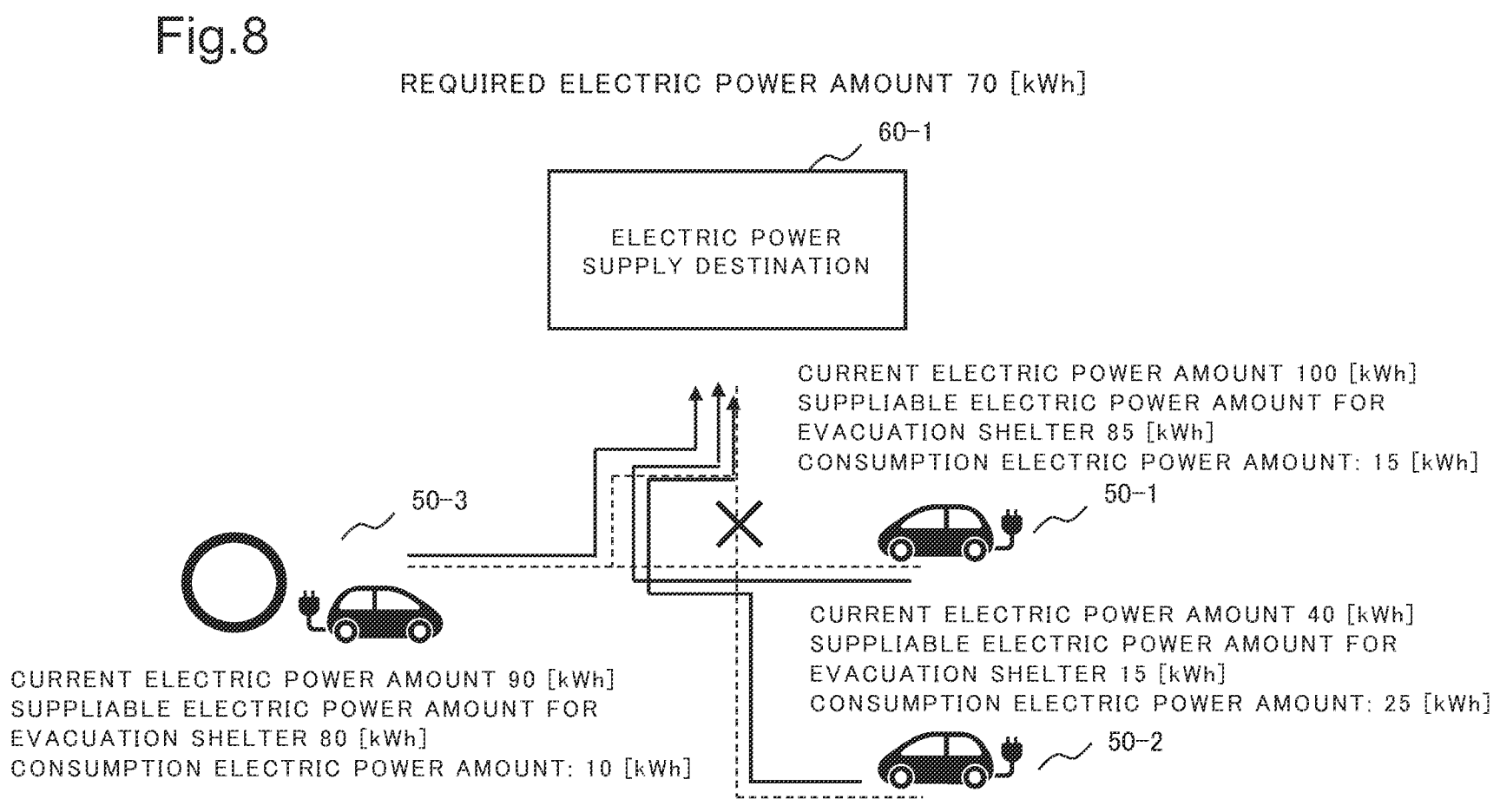

REQUIRED ELECTRIC POWER AMOUNT 70 [kWh]

ELECTRIC POWER
SUPPLY DESTINATION 60-1

CURRENT ELECTRIC POWER AMOUNT 100 [kWh]
SUPPLIABLE ELECTRIC POWER AMOUNT FOR
EVACUATION SHELTER 85 [kWh]
CONSUMPTION ELECTRIC POWER AMOUNT: 15 [kWh]

50-1

CURRENT ELECTRIC POWER AMOUNT 40 [kWh]
SUPPLIABLE ELECTRIC POWER AMOUNT FOR
EVACUATION SHELTER 15 [kWh]
CONSUMPTION ELECTRIC POWER AMOUNT: 25 [kWh]

50-2

50-3

CURRENT ELECTRIC POWER AMOUNT 90 [kWh]
SUPPLIABLE ELECTRIC POWER AMOUNT FOR
EVACUATION SHELTER 80 [kWh]
CONSUMPTION ELECTRIC POWER AMOUNT: 10 [kWh]

Fig.9

REQUIRED ELECTRIC POWER AMOUNT 60 [kWh]

60-1

ELECTRIC POWER SUPPLY DESTINATION (EVACUATION SHELTER A)

CURRENT ELECTRIC POWER AMOUNT 100 [kWh]
SUPPLIABLE ELECTRIC POWER AMOUNT FOR EVACUATION SHELTER A 90 [kWh]
SUPPLIABLE ELECTRIC POWER AMOUNT FOR EVACUATION SHELTER B 80 [kWh]

50-1

CURRENT ELECTRIC POWER AMOUNT 40 [kWh]
SUPPLIABLE ELECTRIC POWER AMOUNT FOR EVACUATION SHELTER A 30 [kWh]
SUPPLIABLE ELECTRIC POWER AMOUNT FOR EVACUATION SHELTER B 30 [kWh]

50-2

CURRENT ELECTRIC POWER AMOUNT 50 [kWh]
SUPPLIABLE ELECTRIC POWER AMOUNT FOR EVACUATION SHELTER A 30 [kWh]
SUPPLIABLE ELECTRIC POWER AMOUNT FOR EVACUATION SHELTER B 40 [kWh]

50-3

SUPPLY TO EVACUATION SHELTER A 90[kWh]

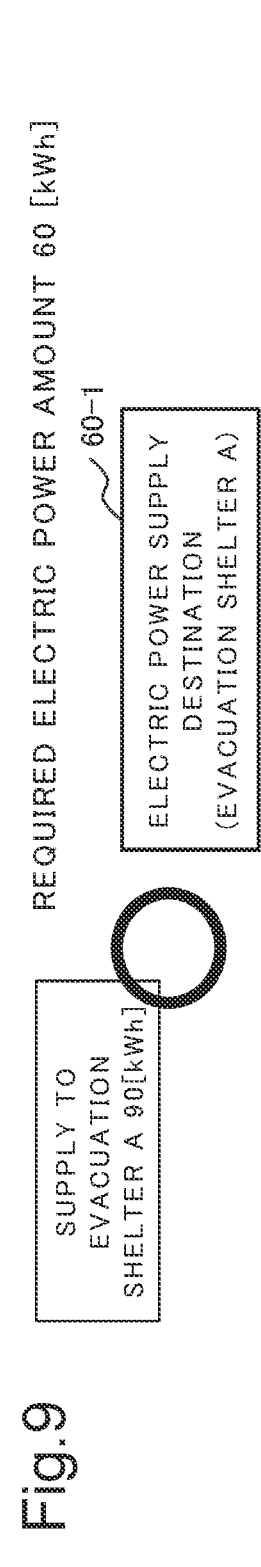

CURRENT ELECTRIC POWER AMOUNT 50 [kWh]
SUPPLIABLE ELECTRIC POWER AMOUNT FOR EVACUATION SHELTER A 40 [kWh]
SUPPLIABLE ELECTRIC POWER AMOUNT FOR EVACUATION SHELTER B 20 [kWh]

50-4

SUPPLY TO EVACUATION SHELTER B 90[kWh]

60-2

ELECTRIC POWER SUPPLY DESTINATION (EVACUATION SHELTER B)

REQUIRED ELECTRIC POWER AMOUNT 100 [kWh]

Fig.10

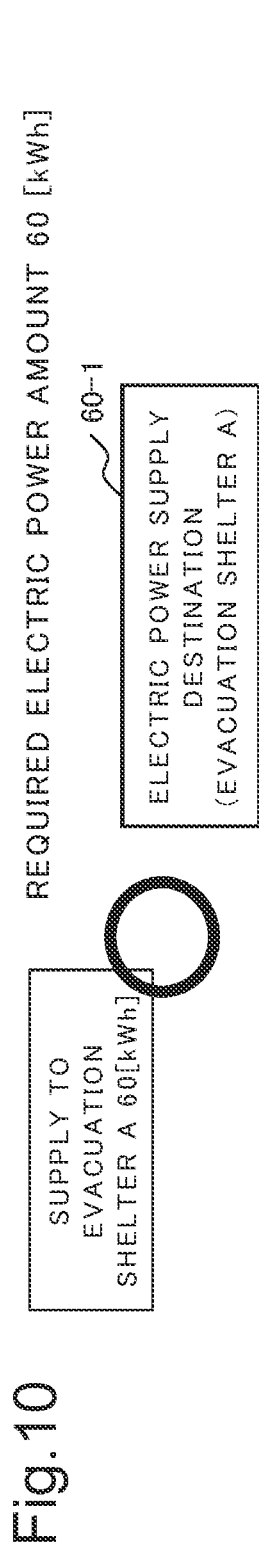

REQUIRED ELECTRIC POWER AMOUNT 60 [kWh]

60—1

ELECTRIC POWER SUPPLY DESTINATION (EVACUATION SHELTER A)

CURRENT ELECTRIC POWER AMOUNT 100 [kWh]
SUPPLIABLE ELECTRIC POWER AMOUNT FOR EVACUATION SHELTER A 90 [kWh]
SUPPLIABLE ELECTRIC POWER AMOUNT FOR EVACUATION SHELTER B 80 [kWh]

50—1

CURRENT ELECTRIC POWER AMOUNT 40 [kWh]
SUPPLIABLE ELECTRIC POWER AMOUNT FOR EVACUATION SHELTER A 30 [kWh]
SUPPLIABLE ELECTRIC POWER AMOUNT FOR EVACUATION SHELTER B 30 [kWh]

50—2

CURRENT ELECTRIC POWER AMOUNT 50 [kWh]
SUPPLIABLE ELECTRIC POWER AMOUNT FOR EVACUATION SHELTER A 30 [kWh]
SUPPLIABLE ELECTRIC POWER AMOUNT FOR EVACUATION SHELTER B 40 [kWh]

50—3

SUPPLY TO EVACUATION SHELTER A 60[kWh]

CURRENT ELECTRIC POWER AMOUNT 50 [kWh]
SUPPLIABLE ELECTRIC POWER AMOUNT FOR EVACUATION SHELTER A 40 [kWh]
SUPPLIABLE ELECTRIC POWER AMOUNT FOR EVACUATION SHELTER B 20 [kWh]

50—4

SUPPLY TO EVACUATION SHELTER B 100[kWh]

REQUIRED ELECTRIC POWER AMOUNT 100 [kWh]

60—2

ELECTRIC POWER SUPPLY DESTINATION

Fig.11

| ELECTRIC POWER SUPPLY DESTINATION ID | VEHICLE ID |
|---|---|
| ELECTRIC POWER SUPPLY DESTINATION 60-1 | VEHICLE 50-2 |
| ELECTRIC POWER SUPPLY DESTINATION 60-1 | VEHICLE 50-3 |
| ELECTRIC POWER SUPPLY DESTINATION 60-2 | VEHICLE 50-1 |
| ELECTRIC POWER SUPPLY DESTINATION 60-2 | VEHICLE 50-4 |

VEHICLE ALLOCATION INFORMATION OUTPUT APPARATUS, VEHICLE ALLOCATION INFORMATION OUTPUT METHOD, AND RECORDING MEDIUM

This application is based upon and claims the benefit of priority from Japanese Patent Application No. 2022-188042, filed on Nov. 25, 2022, the disclosure of which is incorporated herein in its entirety by reference.

TECHNICAL FIELD

The present invention relates to a vehicle allocation information output apparatus and the like.

BACKGROUND ART

There has been devised a service for allocating a vehicle capable of supplying electric power, to an evacuation shelter. For example, a vehicle allocation service apparatus described in PTL 1 (Japanese Unexamined Patent Application Publication No. 2021-144590) calculates a vehicle allocation pattern, based on information indicating a current charging state of a vehicle and master information relating to an evacuation shelter, and outputs information for instructing vehicle allocation.

However, the vehicle described in PTL 1 consumes electric power while traveling to the evacuation shelter. Thus, when the vehicle arrives at the evacuation shelter, there may be a risk that an electric power amount that can be supplied from the vehicle to the evacuation shelter is not enough for an electric power amount required in the evacuation shelter.

In contrast, in methods described in PTL 2 (Japanese Unexamined Patent Application Publication No. 2012-168073) and PTL 3 (Japanese Unexamined Patent Application Publication No. 2020-114051), an electric power amount being consumed by traveling to a destination is considered.

However, in the methods described in PTL 2 and PTL 3, reduction of an electric power amount consumed by traveling to a destination is not considered. Thus, there may be a risk that an electric power amount being wastefully consumed by traveling is increased.

SUMMARY

In view of the above-mentioned problem, an object of the present invention is to provide a vehicle allocation information output apparatus and the like that are able to reduce a consumption electric power amount to be consumed when a vehicle capable of supplying electric power travels to a destination.

According to one aspect of the present invention, a vehicle allocation information output apparatus relates to a vehicle capable of supplying electric power to an electric power supply destination, and outputs vehicle allocation information being information relating to the vehicle to be allocated to the electric power supply destination, the vehicle allocation information output apparatus including an acquisition unit configured to acquire vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination, a retrieval unit configured to retrieve a route from the current location of the vehicle to the electric power supply destination, based on the vehicle location information and the supply destination location information, a calculation unit configured to calculate a suppliable electric power amount of the vehicle on arrival at the electric power supply destination for the route being retrieved, based on the current electric power amount and a consumption electric power amount to be consumed when the vehicle travels to the electric power supply destination via the route, and an output unit configured to output information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than the required electric power amount at the electric power supply destination.

Further, according to another aspect of the present invention, a vehicle allocation information output system relates to a vehicle capable of supplying electric power to an electric power supply destination, and outputs vehicle allocation information being information relating to the vehicle to be allocated to the electric power supply destination, the vehicle allocation information output system including an acquisition means for acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination, a retrieval means for retrieving a route from the current location of the vehicle to the electric power supply destination, based on the vehicle location information and the supply destination location information, a calculation means for calculating a suppliable electric power amount of the vehicle on arrival at the electric power supply destination for the route being retrieved, based on the current electric power amount and a consumption electric power amount to be consumed when the vehicle travels to the electric power supply destination via the route, and an output means for outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than the required electric power amount at the electric power supply destination.

Further, according to another aspect of the present invention, a vehicle allocation information output method relates to a vehicle capable of supplying electric power to an electric power supply destination, and is for outputting vehicle allocation information being information relating to the vehicle to be allocated to the electric power supply destination, the vehicle allocation information output method including acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination, retrieving a route from the current location of the vehicle to the electric power supply destination, based on the vehicle location information and the supply destination location information, calculating a suppliable electric power amount of the vehicle on arrival at the electric power supply destination for the route being retrieved, based on the current electric power amount and a consumption electric power amount to be consumed when the vehicle travels to the electric power supply destination via the route, and outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than the required electric power amount at the electric power supply destination.

Further, according to another aspect of the present invention, a vehicle allocation information output program recorded in a non-transitory computer-readable recording medium relates to a vehicle capable of supplying electric power to an electric power supply destination, and is for outputting vehicle allocation information being information relating to the vehicle to be allocated to the electric power supply destination, the vehicle allocation information output program causing a computer to achieve an acquisition function of acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination, a retrieval function of retrieving a route from the current location of the vehicle to the electric power supply destination, based on the vehicle location information and the supply destination location information, a calculation function of calculating a suppliable electric power amount of the vehicle on arrival at the electric power supply destination for the route being retrieved, based on the current electric power amount and a consumption electric power amount to be consumed when the vehicle travels to the electric power supply destination via the route, and an output function of outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than the required electric power amount at the electric power supply destination.

BRIEF DESCRIPTION OF THE DRAWINGS

Exemplary features and advantages of the present invention will become apparent from the following detailed description when taken with the accompanying drawings in which:

FIG. 1 is a diagram illustrating a configuration example of a vehicle allocation information output apparatus according to a first example embodiment of the present invention:

FIG. 3 is a diagram illustrating a configuration example of a system including a vehicle allocation information output apparatus according to a second example embodiment of the present invention:

FIG. 5 is a diagram illustrating a configuration example of the vehicle allocation information output apparatus according to the second example embodiment of the present invention:

FIG. 6 is a diagram for describing processing executed by an output unit of the vehicle allocation information output apparatus according to the second example embodiment of the present invention:

FIG. 7 is a diagram illustrating an example of vehicle allocation information:

FIG. 8 is a diagram for describing the processing executed by the output unit of the vehicle allocation information output apparatus according to the second example embodiment of the present invention:

FIG. 9 is a diagram for describing the processing executed by the output unit of the vehicle allocation information output apparatus according to the second example embodiment of the present invention:

FIG. 10 is a diagram for describing the processing executed by the output unit of the vehicle allocation information output apparatus according to the second example embodiment of the present invention:

FIG. 11 is a diagram illustrating an example of a vehicle allocation pattern:

EXAMPLE EMBODIMENT

First Example Embodiment

Figure 2:
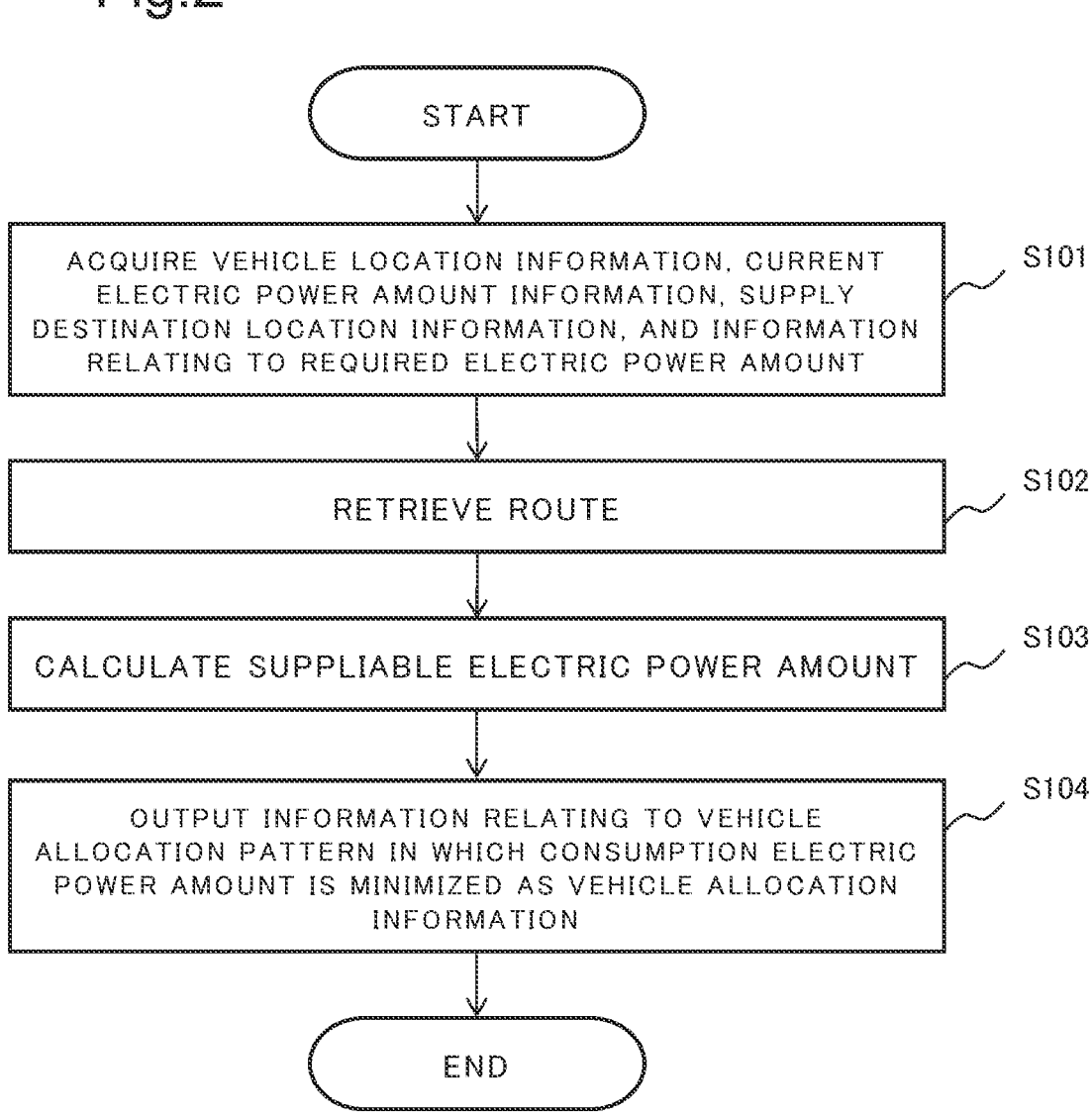
FIG. 2 is a diagram illustrating an example of an operation flow of the vehicle allocation information output apparatus according to the first example embodiment of the present invention.

A first example embodiment of the present invention is described. A specific example of a vehicle allocation information output apparatus 10 of the first example embodiment is a vehicle allocation information output apparatus 20 of a second example embodiment, which is described later.

FIG. 1 illustrates a configuration example of the vehicle allocation information output apparatus 10 of the present example embodiment. The vehicle allocation information output apparatus 10 includes an acquisition unit 11, a retrieval unit 12, a calculation unit 13, and an output unit 14.

the vehicle allocation information output apparatus 10 relates to a vehicle capable of supplying electric power to an electric power supply destination, and outputs vehicle allocation information. The vehicle allocation information is information relating to a vehicle to be allocated to an electric power supply destination. In the following description, as described above, the vehicle indicates a vehicle capable of supplying electric power to the electric power supply destination.

The acquisition unit 11 acquires vehicle location information, current electric power amount information, supply destination location information, and information relating to a required electric power amount. The vehicle location information is information relating to a current location of the vehicle. The current electric power amount information is information relating to a current electric power amount of the vehicle. The supply destination location information is location information relating to the electric power supply destination. The required electric power amount is an electric power amount that is required at the electric power supply destination.

The retrieval unit 12 retrieves a route from a current location of the vehicle to the electric power supply destination, based on the vehicle location information and the supply destination location information.

The calculation unit 13 calculates a suppliable electric power amount of the vehicle on arrival at the electric power supply destination for the route being retrieved, based on the current electric power amount and a consumption electric power amount. The consumption electric power amount is an electric power amount that is consumed when the vehicle travels to the electric power supply destination via the route.

The output unit 14 outputs information relating to a vehicle allocation pattern in which the consumption electric power amount is minimized as the vehicle allocation information, the vehicle allocation pattern being a vehicle allocation pattern in which a total amount of the suppliable electric power amount of the vehicle to be allocated is equal to or greater than a required electric power amount at the electric power supply destination. The vehicle allocation pattern is a candidate of a combination of the electric power supply destination and the vehicle to be allocated to the electric power supply destination.

Next, FIG. 2 illustrates an example of an operation flow of the vehicle allocation information output apparatus 10 of the present example embodiment.

The acquisition unit 11 acquires the vehicle location information, the current electric power amount information, the supply destination location information, and the information relating to the required electric power amount (step S101).

The retrieval unit 12 retrieves the route from the current location of the vehicle to the electric power supply destination, based on the vehicle location information and the supply destination location information (step S102).

The calculation unit 13 calculates the suppliable electric power amount of the vehicle on arrival at the electric power supply destination for the route being retrieved, based on the current electric power amount and the consumption electric power amount (step S103).

The output unit 14 outputs the information relating to the vehicle allocation pattern in which the consumption electric power amount is minimized as the vehicle allocation information, the vehicle allocation pattern being a vehicle allocation pattern in which the total amount of the suppliable electric power amount of the vehicle to be allocated is equal to or greater than the required electric power amount at the electric power supply destination (step S104).

As described above, in the first example embodiment of the present invention, the vehicle allocation information output apparatus 10 includes the acquisition unit 11, the retrieval unit 12, the calculation unit 13, and the output unit 14. The vehicle allocation information output apparatus 10 relates to the vehicle capable of supplying electric power to the electric power supply destination, and outputs the vehicle allocation information. The vehicle allocation information is information relating to the vehicle to be allocated to the electric power supply destination. The acquisition unit 11 acquires the vehicle location information, the current electric power amount information, the supply destination location information, and the information relating to the required electric power amount. The vehicle location information is information relating to a current location of the vehicle. The current electric power amount information is information relating to the current electric power amount of the vehicle. The supply destination location information is location information relating to the electric power supply destination. The required electric power amount is an electric power amount that is required at the electric power supply destination. The retrieval unit 12 retrieves the route from the current location of the vehicle to the electric power supply destination, based on the vehicle location information and the supply destination location information. The calculation unit 13 calculates the suppliable electric power amount of the vehicle on arrival at the electric power supply destination for the route being retrieved, based on the current electric power amount and the consumption electric power amount. The consumption electric power amount is an electric power amount that is consumed when the vehicle travels to the electric power supply destination via the route. The output unit 14 outputs information relating to the vehicle allocation pattern in which the consumption electric power amount is minimized as the vehicle allocation information, the vehicle allocation pattern being a vehicle allocation pattern in which the total amount of the suppliable electric power amount of the vehicle to be allocated is equal to or greater than the required electric power amount at the electric power supply destination. The vehicle allocation pattern is a candidate of a combination of the electric power supply destination and the vehicle to be allocated to the electric power supply destination.

With this, the vehicle allocation information relating to the vehicle allocation pattern in which the consumption electric power is minimized while satisfying the required electric power amount at the electric power supply destination is output. Thus, the consumption electric power amount that is consumed when the vehicle capable of supplying electric power travels to the destination can be reduced more.

Second Example Embodiment

Next, the second example embodiment of the present invention is described. A specific example of the vehicle allocation information output apparatus 10 of the first example embodiment is the vehicle allocation information output apparatus 20 of the second example embodiment.

First, FIG. 3 illustrates a configuration example of a system including the vehicle allocation information output apparatus 20 of the present example embodiment. The system illustrated in FIG. 3 includes the vehicle allocation information output apparatus 20 and a vehicle 50-*i* (i is an integer from 1 to N).

The vehicle 50-I is capable of supplying electric power to an electric power supply destination 60-*j* (j is an integer from 1 to M). The vehicle 50-*i* includes a chargeable/dischargeable battery. For example, the vehicle 50-*i* is an electric vehicle or a hybrid car. Further, the vehicle 50-*i* travels by using electric power stored in the battery.

The vehicle 50-*i* can be connected wirelessly to a communication line 80. Further, the vehicle 50-*i* can communicate with the vehicle allocation information output apparatus 20 via the communication line 80. Electric power of the battery of the vehicle 50-*i* may be used for communication between the vehicle 50-*i* and the vehicle allocation information output apparatus 20.

The electric power supply destination 60-*j* is supplied with electric power from the vehicle 50-*i*. For example, when electric power is not supplied to an evacuation shelter due to a power cut or the like, the electric power supply destination 60-*j* is supplied with electric power from the vehicle 50-*i*. For example, the evacuation shelter refers to a facility for refuge that is established by a local government or the like during a disaster. For example, the electric power supply destination 60-*j* is a group of electrical appliances (such as lighting, heating and cooling systems, a television, a radio, and cooking appliances) or a battery at the evacuation shelter. The electric power supply destination 60-*j* may be supplied with electric power directly from the vehicle 50-*i* without using a battery of the electric power supply destination 60-*j*. Further, the electric power supply destination 60-*j* may be supplied with electric power via the battery of the electric power supply destination 60-*j*. In this case, the vehicle 50-*i* supplies electric power to the battery of the electric power supply destination 60-*j*.

Figure 4:
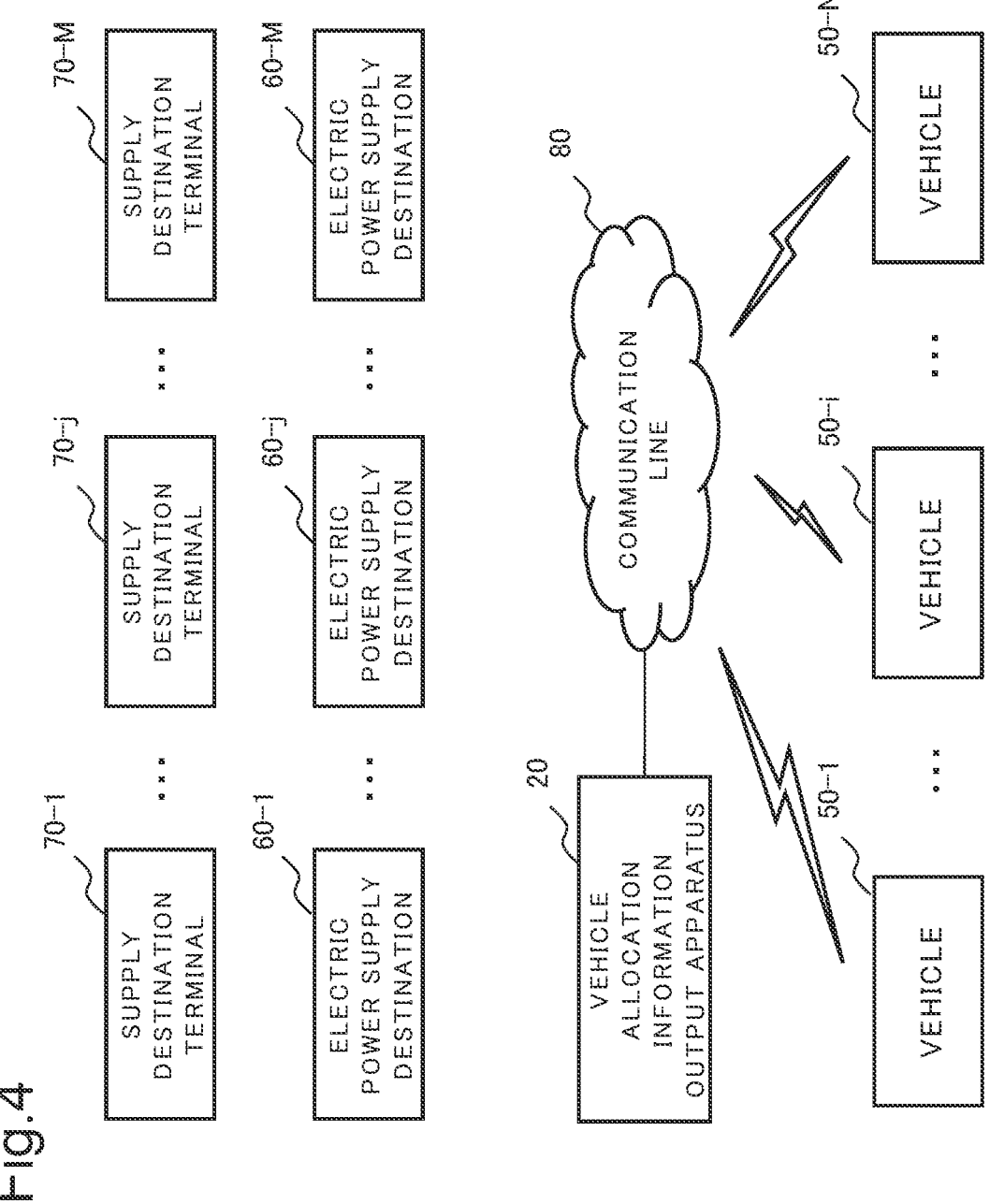
FIG. 4 is a diagram illustrating another configuration example of the system including the vehicle allocation information output apparatus according to the second example embodiment of the present invention.

The electric power supply destination 60-*j* may be provided with a supply destination terminal 70-*j*. FIG. 4 illustrates a configuration example of a system in which the electric power supply destination 60-*j* is provided with the supply destination terminal 70-*j*. The supply destination terminal 70-*j* can be connected to the communication line 80 in a wireless or wired manner. When a battery for supplying electric power to the supply destination terminal 70-*j* has remaining electric power, or is connected to an electric power source for supplying electric power to the supply destination terminal 70, the supply destination terminal 70-*j* is in a communicable state. The battery for supplying electric power to the supply destination terminal 70-*j* may be the battery of the electric power supply destination 60-*j*, the battery of the vehicle 50-*i* that supplies electric power to the electric power supply destination 60-*j*, or a battery other than those batteries.

The vehicle allocation information output apparatus 20 outputs vehicle allocation information. The vehicle allocation information is information relating to the vehicle 50-*i* to be allocated to the electric power supply destination 60-*j*. The vehicle 50-*i* travels to the electric power supply destination 60-*j* being a vehicle allocation destination of the vehicle, according to the vehicle allocation information, and supplies electric power to the electric power supply destination 60-*j*.

For example, the vehicle allocation information output apparatus 20 outputs the vehicle allocation information to the vehicle 50-*i* to be allocated to the electric power supply destination 60-*j*. In this case, the output of the vehicle allocation information is equivalent to an instruction for the vehicle 50-*i* to supply electric power to the electric power supply destination 60-*j*. Further, the vehicle allocation information output apparatus 20 may cause a display means to display the vehicle allocation information.

The vehicle allocation information output apparatus 20 can be connected to the communication line 80 in a wired or wireless manner. The vehicle allocation information output apparatus 20 is supplied with electric power. Even when a power cut occurs in the peripheral area, electric power is supplied to the vehicle allocation information output apparatus 20. For example, the vehicle allocation information output apparatus 20 is provided with redundancy in electric power, an electric power generator, or the like.

Figure 5:
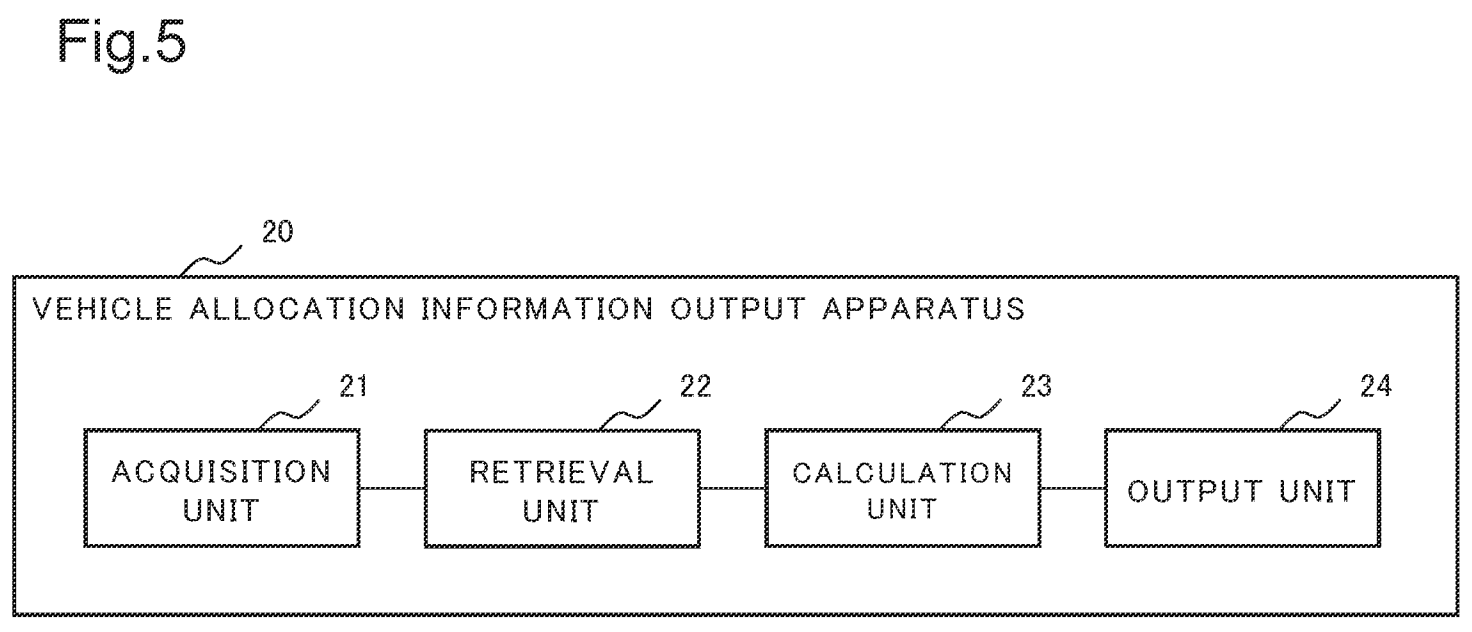

Next, FIG. 5 illustrates a configuration example of the vehicle allocation information output apparatus 20 of the present example embodiment. The vehicle allocation information output apparatus 20 includes an acquisition unit 21, a retrieval unit 22, a calculation unit 23, and an output unit 24.

The acquisition unit 21 acquires vehicle location information and current electric power amount information that relate to the vehicle 50-*i*. The vehicle location information is information relating to a current location of the vehicle 50-*i*. Further, the current electric power amount information is information relating to a current electric power amount of the vehicle 50-*i*. The acquisition unit 21 is capable of acquiring the vehicle location information and the current electric power amount information from the vehicle 50-*i*. For example, the acquisition unit 21 requests the vehicle location information and the current electric power amount information from the vehicle 50-*i*, and receives the information transmitted from the vehicle 50-*i*. The vehicle 50-*i* is capable of grasping the current location of the vehicle 50-*i* by utilizing the global navigation satellite system (GNSS) or the like.

Further, the acquisition unit 21 may acquire supply destination location information relating to the electric power supply destination 60-*j*. The supply destination location information is location information relating to the electric power supply destination 60-*j*. For example, the acquisition unit 21 may acquire the supply destination location information from a storage means (omitted in illustration) provided to the inside or the outside of the vehicle allocation information output apparatus 20. Alternatively, the supply destination location information may be acquired from the supply destination terminal 70-*j* used at the electric power supply destination 60-*j*. For example, the acquisition unit 21 may request the supply destination location information from the supply destination terminal 70-*j* and receive the supply destination location information from the supply destination terminal 70-*j*. The supply destination terminal 70-*j* may grasp the location of the supply destination terminal 70-*j* by utilizing the GNSS or the like. Further, the supply destination location information may be input to the supply destination terminal 70-*j* by an operation of a user.

Further, the acquisition unit 21 may acquire required electric power amount information relating to the electric power supply destination 60-*j*. The required electric power amount information is information relating to an electric power amount that is required at the electric power supply destination 60-*j*. For example, the acquisition unit 21 may acquire the required electric power amount information from a storage means provided to the inside or the outside of the vehicle allocation information output apparatus 20. Alternatively, the required electric power amount information may be acquired from the supply destination terminal 70-*j* used at the electric power supply destination 60-*j*. The required electric power amount information may be determined in advance according to a scale of an evacuation shelter, or may be determined dynamically according to an evacuation state or the like. The required electric power amount information may be input to the supply destination terminal 70-*j* by a user.

For example, the required electric power amount may be an electric power amount that is consumed at the electric power supply destination 60-*j* for a unit time (for example, one day).

For example, the required electric power amount may be an electric amount that is calculated based on capacity for accommodating people in an evacuation shelter. In this case, for example, the required electric power amount may be a value acquired by multiplying an electric power amount required for a person per unit time by the capacity for accommodating people and then adding a fixed electric power amount per unit time for opening an evacuation shelter (an electric power amount to be used even when there are no evacuees).

Further, for example, the required electric power amount may be an electric power that is calculated from the actual number of evacuees in an evacuation shelter. In this case, for example, the required electric power amount may be a value acquired by multiplying an electric power amount required for a person per unit time by the number of evacuees and then adding a fixed electric power amount per unit time for opening an evacuation shelter. For example, the number of evacuees may be input to the supply destination terminal 70-*j* by a user, or may be input to the supply destination terminal 70-*j* or the vehicle allocation information output apparatus 20 from another system.

Further, for example, the required electric power amount may be acquired by subtracting a remaining electric power amount of the battery from a desired electric power amount to be stored in the battery of the electric power supply destination 60-*j*. In this state, for example, the desired electric power amount to be stored in the battery may be acquired by adding a reserve amount to an electric power amount consumed at an evacuation shelter per unit time.

The retrieval unit 22 retrieves a route from the current location of the vehicle 50-*i* to the electric power supply destination 60-*j*, based on the vehicle location information and the supply destination location information. When the plurality of vehicles 50-*i* are present (in other words, a case in which N is equal to or greater than 2), the retrieval unit 22 retrieves a route for each of the vehicles 50-*i*. Further, when the plurality of electric power supply destinations 60-*j* are present (in other words, a case in which M is equal to or greater than 2), the retrieval unit 22 retrieves a route for each of the electric power supply destinations 60-*j*. The retrieval unit 22 may retrieve one or two or more routes for each of combinations of the vehicles 50-*i* and the electric power supply destinations 60-*j*. The route retrieval may be achieved by a general method using map information.

Further, the retrieval unit 22 may retrieve a passable route by using disaster information for the route retrieval. The disaster information is information relating to an impassable location due to a disaster. The retrieval unit 22 retrieves a route that does not involve an impassable location. The acquisition unit 21 may acquire the disaster information from an information providing server (omitted in illustration) that provides the disaster information.

The calculation unit 23 calculates a suppliable electric power amount for the route that is retrieved by the retrieval unit 22. The suppliable electric power amount is an electric power amount that can be supplied by the vehicle 50-*i* when the vehicle 50-*i* arrives at the electric power supply destination 60-*j*. When the retrieval unit 22 retrieves two or more routes, the calculation unit 23 calculates a suppliable electric power amount for each of the routes being retrieved.

The calculation unit 23 is capable of calculating the suppliable electric power amount, based on the current electric power amount and a consumption electric power amount of the vehicle 50-*i*. The consumption electric power amount is an electric power amount that is consumed when the vehicle 50-*i* travels to the electric power supply destination 60-*j* via the route being retrieved. For example, the calculation unit 23 calculates the suppliable electric power amount by subtracting the consumption electric power amount from the current electric power amount of the vehicle 50-*i*.

For example, the calculation unit 23 is capable of calculating the consumption electric power amount, based on unit consumption amount information. For example, the unit consumption amount information is information relating to an electric power amount that is consumed when the vehicle 50-*i* travels for a unit time. The electric power amount that is consumed when the vehicle 50-*i* travels for a unit time is hereinafter referred to as a unit consumption amount. For example, the consumption electric power amount is calculated by multiplying the unit consumption amount by a time period required for traveling the route retrieved by the retrieval unit 22.

The unit consumption amount information is stored in advance in a storage means provided to the inside or the outside of the vehicle allocation information output apparatus 20. The unit consumption amount information may be information indicating an actual measurement value in the past or information indicating a catalogue value. Further, the unit consumption amount may be an electric power amount that is consumed for traveling, or may be acquired by adding an electric power amount that is consumed for communication to the electric power amount that is consumed for traveling.

Further, the calculation unit 23 may calculate the consumption electric power amount by using traffic information. The traffic information is information relating to a traffic. For example, the traffic information may be information relating to traffic congestion along the route or information relating to an estimated velocity of the vehicle on the route. For example, the acquisition unit 21 may acquire the traffic information from an information providing server that provides the traffic information.

For example, when the route is divided into P sections by dividing the route into units of time, the calculation unit 23 may calculate the consumption electric power amount by using the following expression (1).

$$\text{Consumtion Electric Power Amount} = \sum_{k=1}^{P} C_k \qquad (1)$$

In this expression, the unit consumption amount $C_k$ is a consumption electric power amount per unit time, and depends on a velocity of the vehicle 50-*i*. In this case, the unit consumption amount information is information relating to the unit consumption amount $C_k$ that is associated with a velocity. The unit consumption amount is increased as the velocity is higher, and is reduced as the velocity is lower.

For example, the unit consumption amount per hour is 5 kWh when the vehicle travels at a velocity of 20 km/h, and the consumption electric power amount is 2.5 kWh when the vehicle travels for a distance of 10 km. Further, the unit consumption amount per hour is 8 kWh when the vehicle travels at a velocity of 60 km/h, and the consumption electric power amount is 1.3 kWh when the vehicle travels for a distance of 10 km.

Further, the calculation unit 23 may calculate the consumption electric power amount by using geographical information. The geographical information is information relating to geographical features. For example, the geographical information is information relating to a gradient. The acquisition unit 21 may acquire the geographical information from a storage means provided to the inside or the outside of the vehicle allocation information output apparatus 20 or an information providing server that provides the geographical information. The acquisition unit 21 may acquire geographical information relating to the route that is retrieved by the retrieval unit 22.

For example, when the route is divided into P sections by dividing the route into units of time, the calculation unit 23 may calculate the consumption electric power amount by using the following expression (2).

$$\text{Consumtion Electric Power Amount} = \sum_{k=1}^{P} (C_k \times F_k) \qquad (2)$$

In this expression, $C_k$ is a unit consumption amount, in other words, a consumption electric power amount per unit time. The unit consumption amount $C_k$ depends on a velocity of the vehicle 50-*i*. In this case, the unit consumption amount information is information relating to the unit consumption amount $C_k$ that is associated with a velocity. Further, $F_k$ is a coefficient with respect to the unit consumption amount. The consumption electric power amount is increased on an uphill slope as compared to a flat road, and is reduced on a downhill slope. Thus, the coefficient $F_k$ is equal to or greater than 1 when a divided section is an uphill slope, and is equal to or less than 1 when a divided section is a downhill slope. The coefficient $F_k$ may depend on an angle of a gradient. Information relating to the coefficient $F_k$ is stored in advance in a storage means provided to the inside or the outside of the vehicle allocation information output apparatus 20.

The output unit 24 outputs information relating to a vehicle allocation pattern in which the consumption electric power amount is minimized as the vehicle allocation information, the vehicle allocation pattern being a vehicle allocation pattern being in which the total amount of the suppliable electric power amount of the vehicle to be allocated is equal to or greater than the required electric power amount at the electric power supply destination. The vehicle allocation pattern is a candidate of a combination of an electric power supply destination and a vehicle to be allocated to the electric power supply destination, in other words, a candidate of the vehicle allocation information. With regard to the vehicle allocation pattern and the vehicle allocation information, the number of vehicles to be allocated to one electric power supply destination 60-*j* may be two or more.

More specifically, for example, the output unit 24 first generates the vehicle allocation pattern. In this state, for all the electric power supply destinations 60-*j*, the output unit 24 generates a vehicle allocation pattern in which the total amount of the suppliable electric power amount of the vehicle to be allocated to the electric power supply destination 60-*j* satisfies the required electric power amount at the electric power supply destination 60-*j*. Further, when there are a plurality of vehicle allocation patterns that satisfy the required electric power amounts of all the electric power supply destinations 60-*j*, a plurality of vehicle allocation patterns are generated.

For example, the output unit 24 generates candidate vehicle allocation patterns for the electric power supply destinations (vehicle allocation patterns) through an exhaustive process. Further, for each of the vehicle allocation patterns being generated, the output unit 24 compares the suppliable electric power amount and the required electric power amount with each other. Further, for all the electric power supply destinations 60-*j*, the output unit 24 leaves, as a candidate, a vehicle allocation pattern in which the total amount of the suppliable electric power amount of the vehicle to be allocated to the electric power supply destination 60-*j* satisfies the required electric power amount at the electric power supply destination 60-*j*. At the time of generating the vehicle allocation patterns through an exhaustive process, the output unit 24 may generate a vehicle allocation pattern while comparing the suppliable electric power amount and the required electric power amount with each other. Further, the output unit 24 may employ methods in a freely selective manner to reduce the computational complexity in generating the vehicle allocation patterns.

The suppliable electric power amount of the vehicle is changed according to an electric power supply destination to which the vehicle is allocated, in other words, a route. The suppliable electric power amount according to the route is calculated by the calculation unit 23. When a plurality of routes are retrieved for a combination of one vehicle and one electric power supply destination, the output unit 24 generates vehicle allocation patterns while regarding the plurality of routes as route candidates.

Further, when the plurality of vehicle allocation patterns are generated, the output unit 24 calculates a total amount of the consumption electric power amount of the vehicle 50-*i* for each of the vehicle allocation patterns being generated. The consumption electric power amount of the vehicle 50-*i* to be allocated to the electric power supply destination 60-*j* is calculated by the calculation unit 23.

Further, the output unit 24 outputs the information relating to the vehicle allocation pattern in which the total amount of the consumption electric power amount is minimized as the vehicle allocation information.

The consumption electric power amount is an electric power amount that is used when the vehicle 50-*i* travels, and hence is an electric power that is not supplied to the electric power supply destination 60-*j*. In other words, the consumption electric power amount is a wasted electric power amount. Therefore, it is desired that a total amount of the consumption electric power amount be minimized as much as possible. Thus, the output unit 24 outputs the information relating to the vehicle allocation pattern in which the total amount of the consumption electric power amount is minimized as the vehicle allocation information.

When a plurality of vehicle allocation patterns in which a total amount of the consumption electric power amount is minimized are present, the output unit 24 may output information relating to a vehicle allocation pattern in which a total reserve electric power amount is maximized as the vehicle allocation information. The total reserve electric power amount is a total amount of the reserve electric power amount in each of the electric power supply destinations 60-*j*. The reserve electric power is a difference between the required electric power amount at the electric power supply destination 60-*j* and the total amount of the suppliable electric power amount of the vehicle to be allocated to the electric power supply destination 60-*j*. In this manner, vehicle allocation can be performed with a margin for the required electric power amount while reducing the consumption electric power amount.

For example, when there is no vehicle allocation pattern that satisfies the required electric power amounts of all the electric power supply destinations 60-j, the output unit 24 generates a vehicle allocation pattern in which an electric power amount to be supplied to the electric power supply destination 60-j is maximized. The output unit 24 may generate a vehicle allocation pattern in which a total amount of an electric power amount being a shortfall to the required electric power amount at the electric power supply destination 60-j is minimized. Further, the output unit 24 outputs information relating to the vehicle allocation pattern being generated, as the vehicle allocation information. When a plurality of vehicle allocation pattern being generated are present, the information relating to the vehicle allocation pattern in which the total amount of the consumption electric power amount is minimized is output as the vehicle allocation information.

The vehicle allocation information may be transmitted to the vehicle to be allocated. In this case, for the vehicle, the vehicle allocation information may include information relating to an electric power supply destination being a vehicle allocation destination of the vehicle. Further, for example, the vehicle allocation information may be output to a display means.

Further, the vehicle allocation information may include information relating to the route in the vehicle allocation pattern whose information is output as the vehicle allocation information. In this case, a driver of the vehicle drives the vehicle according to the information relating to the route. Alternatively, the vehicle may autonomously travel according to the information relating to the route.

FIG. 6 and FIG. 8 illustrate diagrams for describing processing executed by the output unit 24. In the examples in FIG. 6 and FIG. 8, one electric power supply destination (the electric power supply destination 60-1) and three vehicles (the vehicle 50-1 to the vehicle 50-3) are present.

In the example in FIG. 6, when the vehicle 50-1 or the vehicle 50-3 is allocated to the electric power supply destination 60-1, the required electric power amount at the electric power supply destination 60-1 is satisfied. In other words, in this example, two vehicle allocation patterns are conceived. Of the two vehicle allocation patterns, allocation of the vehicle 50-1 requires a less consumption electric power amount. Thus, the output unit 24 outputs the vehicle allocation information indicating allocation of the vehicle 50-1 to the electric power supply destination 60-1. FIG. 7 illustrates an example of the vehicle allocation information in this state.

Further, in the example in FIG. 8, the consumption electric power amounts of the vehicle 50-1 and the vehicle 50-2 are increased as compared to the case in FIG. 6 so as to avoid an impassable location point. Thus, allocation of the vehicle 50-3 to the electric power supply destination 60-1 requires a less consumption electric power amount. Thus, the output unit 24 outputs the vehicle allocation information indicating allocation of the vehicle 50-3 to the electric power supply destination 60-1.

Next, FIG. 9 and FIG. 10 illustrate diagrams for describing processing of the output unit 24 when a plurality of electric power supply destinations are present. In the examples in FIG. 9 and FIG. 10, two electric power supply destinations (the electric power supply destination 60-1 and the electric power supply destination 60-2) and four vehicles (the vehicle 50-1 to the vehicle 50-4) are present.

As in the example in FIG. 9, when vehicle allocation is performed to the electric power supply destination 60-1 and the electric power supply destination 60-2, the current electric power amount satisfies the required electric power amounts at both the electric power supply destinations. However, the electric power is consumed during the travel to reduce the suppliable electric power amount, and the required electric power amount at the electric power supply destination 60-2 (evacuation shelter B) cannot be satisfied. Thus, as in the example in FIG. 10, the output unit 24 generates a vehicle allocation pattern that satisfies both the required electric power amounts. FIG. 11 illustrates an example of the information relating to the vehicle allocation pattern in this state.

Figure 12:
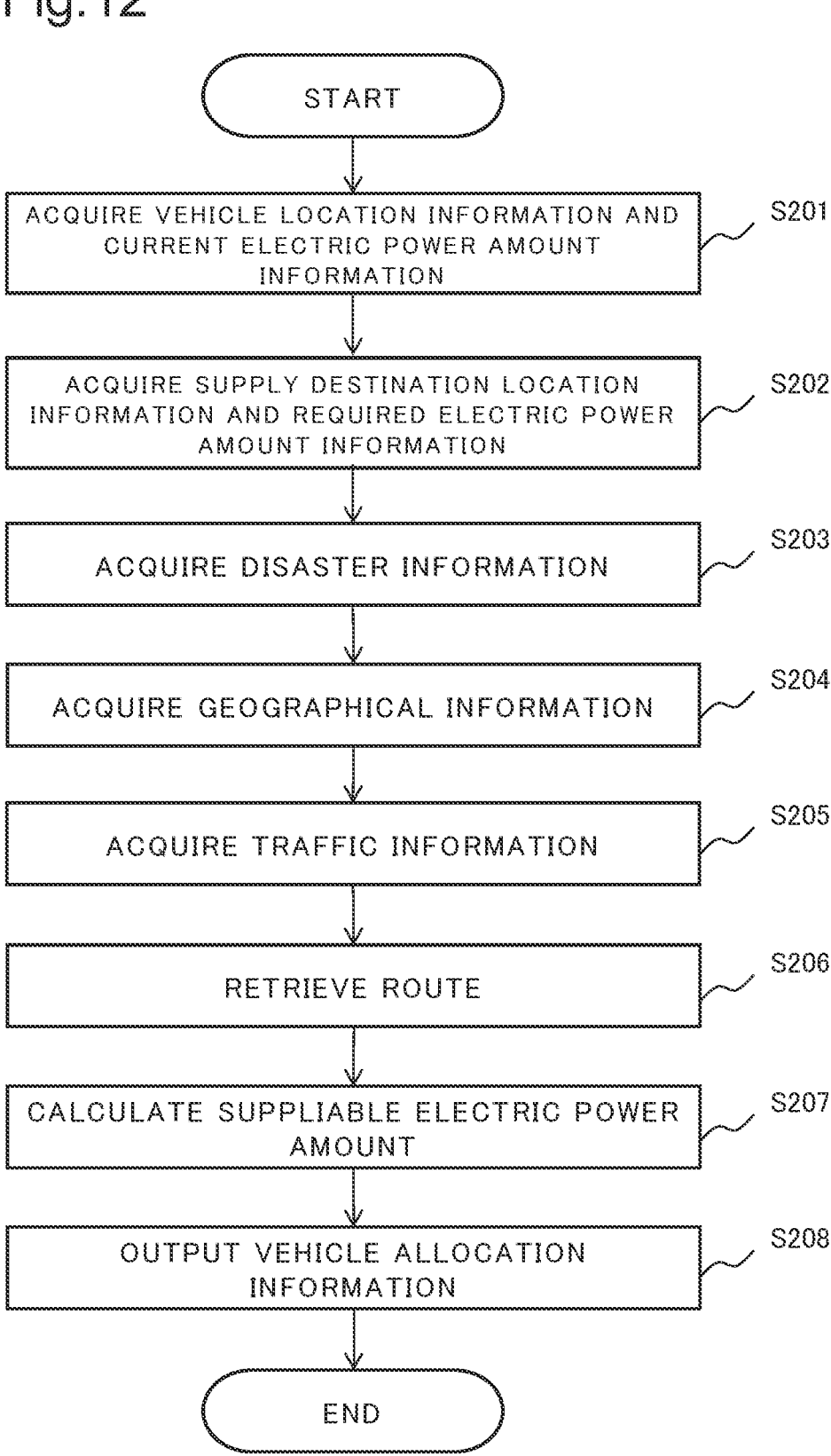
FIG. 12 is a diagram illustrating an example of an operation flow of the vehicle allocation information output apparatus according to the second example embodiment of the present invention.

Next, FIG. 12 illustrates an example of an operation flow of the vehicle allocation information output apparatus 20 of the present example embodiment.

When a vehicle allocation instruction is input, the acquisition unit 21 acquires the vehicle location information and the current electric power amount information for each of the vehicles 50-i (step S201). Further, the acquisition unit 21 may acquire the supply destination location information and the required electric power amount information for the electric power supply destination 60-j (step S202).

For example, the vehicle allocation instruction is input according to an operation input of a user. For example, when the required electric power amount at the electric power supply destination 60-j is the required electric power amount per day, the vehicle allocation instruction may be input on a daily basis. Further, the vehicle allocation instruction may automatically be input from another system when a local government provides evacuation information and decides an opening of an evacuation shelter, or a power cut occurs at an evacuation shelter.

Further, the acquisition unit 21 may acquire the disaster information (step S203). Further, the acquisition unit 21 may acquire the geographical information (step S204). Further, the acquisition unit 21 may acquire the traffic information (step S205).

The retrieval unit 22 retrieves the route from each of the vehicles 50-i to each of the electric power supply destinations 60-j (step S206). In this state, the retrieval unit 22 may retrieve a passable route in consideration of the disaster information.

The calculation unit 23 calculates the suppliable electric power amount for each of the routes being retrieved in step S206 (step S207). In this state, the calculation unit 23 may calculate the suppliable electric power amount by using the geographical information. Further, the calculation unit 23 may calculate the suppliable electric power amount by using the traffic information.

Further, the output unit 24 outputs the information relating to the vehicle allocation pattern in which the consumption electric power amount is minimized as the vehicle allocation information, the vehicle allocation pattern being a vehicle allocation pattern in which the total amount of the suppliable electric power amount of the vehicle to be allocated is equal to or greater than the required electric power amount that is required at the electric power supply destination (step S208).

Figure 13:
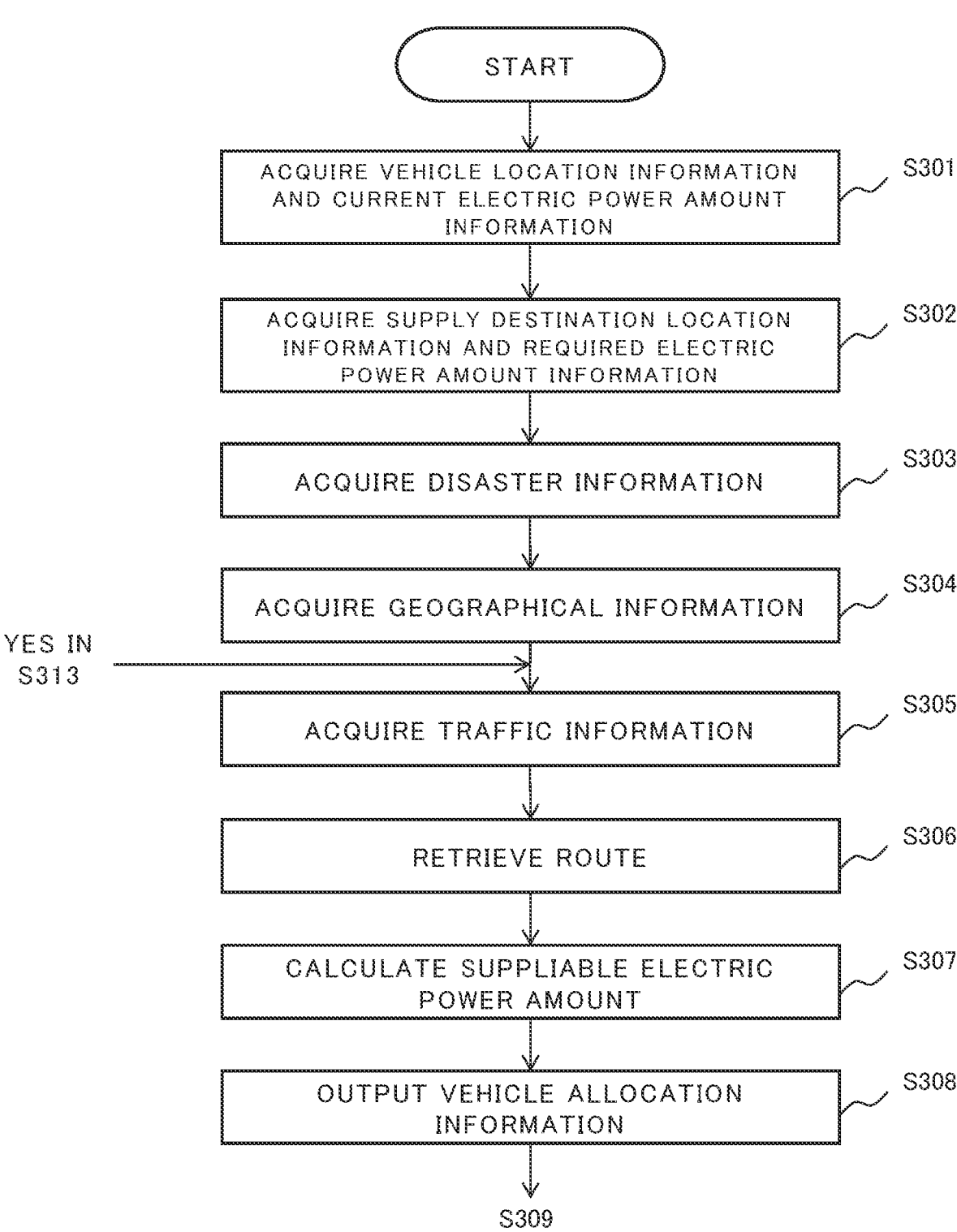
FIG. 13 is a diagram illustrating an example of another operation flow of the vehicle allocation information output apparatus according to the second example embodiment of the present invention.
Figure 14:
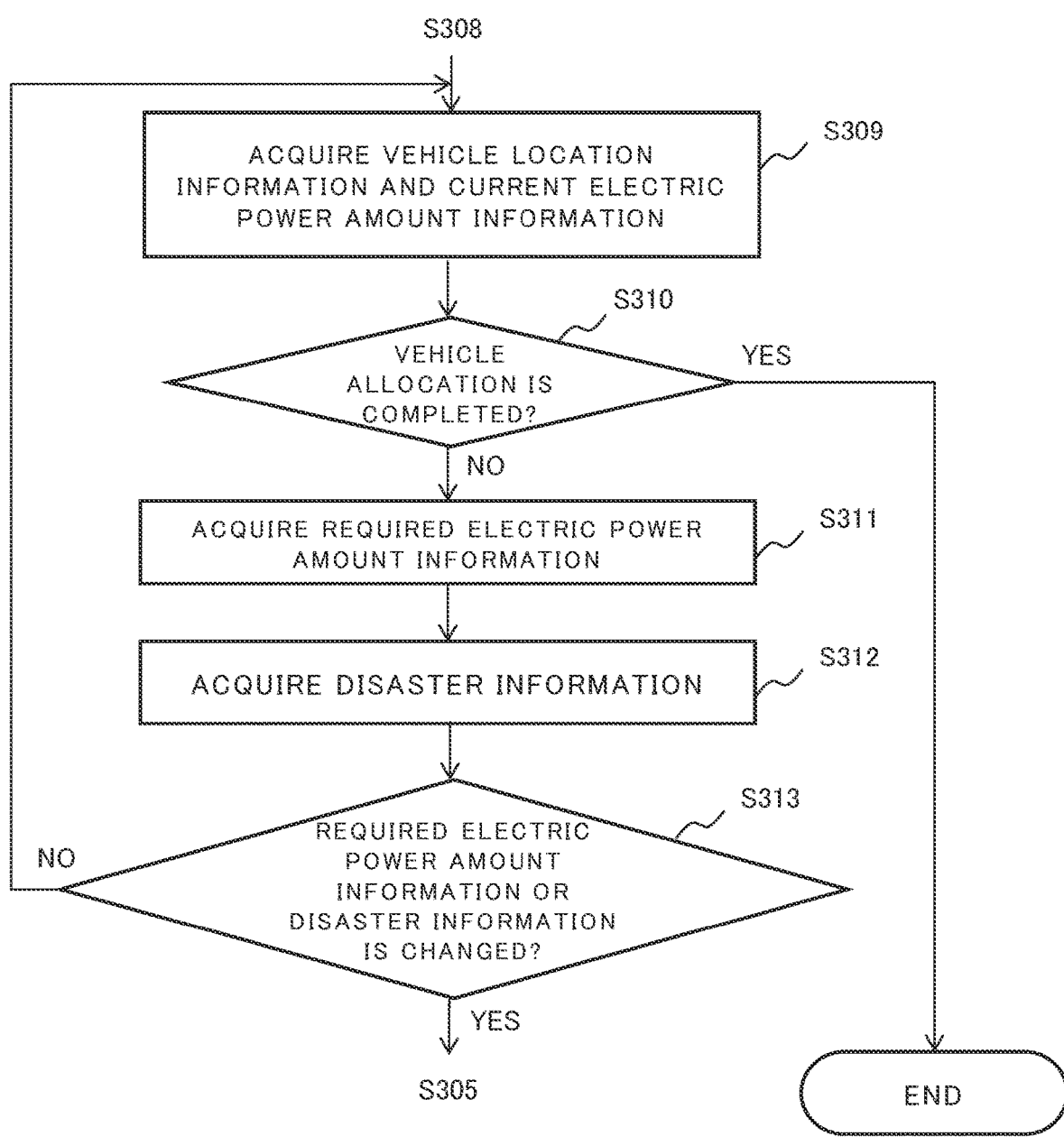
FIG. 14 is a diagram illustrating an example of another operation flow of the vehicle allocation information output apparatus according to the second example embodiment of the present invention.

Further, FIG. 13 and FIG. 14 illustrate an example of another operation flow of the vehicle allocation information output apparatus 20 of the present example embodiment.

First, step S301 to step S308 in FIG. 13 are similar to step S201 to step S208 in FIG. 12.

When the vehicle allocation information is output in step S308, the acquisition unit 21 acquires the vehicle location information and the current electric power amount information again after a predetermined time elapses (step S309). In this case, the predetermined time is one minute or five minutes, for example.

The acquisition unit 21 confirms whether vehicle allocation is completed, based on the vehicle allocation information that is output in step S308 and the vehicle location information that is acquired in step S309. When the vehicle to be allocated to the electric power supply destination 60-*j* arrives at the electric power supply destination 60-*j*, the acquisition unit 21 determines that vehicle allocation to the electric power supply destination 60-*j* is completed. Further, when vehicle allocation to all the electric power supply destinations 60-*j* is completed (YES in step S310), the vehicle allocation information output apparatus 20 terminates a series of processing relating to the output of the vehicle allocation information.

When the electric power supply destination 60-*j* to which vehicle allocation is not completed is present (NO in step S310), the acquisition unit 21 acquires the required electric power amount information (step S311). When the required electric power amount information may possibly be changed, the acquisition unit 21 performs the operation in step S311. For example, the required electric power amount information may be calculated based on capacity for accommodating people at the time of opening an evacuation shelter, and then may be calculated based on the actual number of people in the evacuation shelter. In such a case, the required electric power amount information may possibly be changed during a time period from the output of the vehicle allocation information in step S308 to the completion of vehicle allocation. Further, when an electric power supply destination is added, the acquisition unit 21 may acquire supply destination location information and required electric power amount information relating to the electric power supply destination being added.

Further, the acquisition unit 21 acquires the disaster information (step S312).

When the required electric power amount information that is newly acquired or the disaster information is changed from the information being previously acquired (YES in step S313), the vehicle allocation information output apparatus 20 performs the operations from step S305 to step S308, in other words, acquisition of the traffic information, retrieval of the route, calculation of the suppliable electric power amount. and output of the vehicle allocation information. In step S308, when the new vehicle allocation information is not changed from the vehicle allocation information that is previously output, the output unit 24 may not be required to output the new vehicle allocation information.

Further, when an expected vehicle allocation completion time point based on the new vehicle allocation information is delayed by a predetermined time or more as compared to an expected vehicle allocation completion time point based on the vehicle allocation information that is previously output, the output unit 24 may not be required to output the new vehicle allocation information. For example, the expected vehicle allocation completion time point may be a time point acquired by adding a time period required for the vehicle to be allocated to arrive at the electric power supply destination to a time point at which the vehicle allocation information is output or an expected output time point.

When there is no change in the required electric power amount information and the disaster information (NO in step S313), the vehicle allocation information output apparatus 20 performs the operation in step S309 after a predetermined time elapses.

As described above, until vehicle allocation is completed, the vehicle allocation information output apparatus 20 is capable of confirming change in the required electric power amount information and the disaster information at a predetermined interval and updating the vehicle allocation information when any one of those pieces of the information is changed.

As described above, in the second example embodiment of the present invention, the vehicle allocation information output apparatus 20 includes the acquisition unit 21, the retrieval unit 22, the calculation unit 23, and the output unit 24. The vehicle allocation information output apparatus 20 relates to the vehicle capable of supplying electric power to the electric power supply destination, and outputs the vehicle allocation information. The vehicle allocation information is information relating to the vehicle to be allocated to the electric power supply destination. The acquisition unit 21 acquires the vehicle location information, the current electric power amount information, the supply destination location information, and the information relating to the required electric power amount. The vehicle location information is information relating to a current location of the vehicle. The current electric power amount information is information relating to the current electric power amount of the vehicle. The supply destination location information is location information relating to the electric power supply destination. The required electric power amount is an electric power amount that is required at the electric power supply destination. The retrieval unit 22 retrieves the route from the current location of the vehicle to the electric power supply destination, based on the vehicle location information and the supply destination location information. The calculation unit 23 calculates the suppliable electric power amount of the vehicle on arrival at the electric power supply destination for the route being retrieved, based on the current electric power amount and the consumption electric power amount. The consumption electric power amount is an electric power amount that is consumed when the vehicle travels to the electric power supply destination via the route. The output unit 24 outputs information relating to the vehicle allocation pattern in which the consumption electric power amount is minimized as the vehicle allocation information, the vehicle allocation pattern being a vehicle allocation pattern in which a total amount of the suppliable electric power amount of the vehicle to be allocated is equal to or greater than the required electric power amount at the electric power supply destination. The vehicle allocation pattern is a candidate of a combination of the electric power supply destination and the vehicle to be allocated to the electric power supply destination.

With this, the vehicle allocation information relating to the vehicle allocation pattern in which the consumption electric power is minimized while satisfying the required electric power amount at the electric power supply destination is output. Thus, the consumption electric power amount that is consumed when the vehicle capable of supplying electric power travels to the destination can be reduced more.

Further, the output unit 24 transmits the vehicle allocation information to the vehicle to be allocated. In this state, for the vehicle to be allocated, the vehicle allocation information includes information relating to an electric power supply destination being a vehicle allocation destination of the vehicle. With this, the vehicle can travel by a driving operation of a driver or an autonomous driving operation according to the vehicle allocation information.

Further, the vehicle allocation information includes information relating to the route in the vehicle allocation pattern whose information is output as the vehicle allocation information. With this, the vehicle can travel by a driving operation of a driver or an autonomous driving operation according to the route in the vehicle allocation pattern whose information is output as the vehicle allocation information.

Further, the calculation unit 23 calculates the consumption electric power amount by using the information relating to an electric power amount that is consumed when the vehicle travels for a unit time. With this, the calculation unit 23 is capable of calculating the consumption electric power amount according to a travel time of the vehicle.

Further, the calculation unit 23 may calculate the consumption electric power amount by using the traffic information being information relating to a traffic. With this, for example, the calculation unit 23 is capable of calculating the consumption electric power amount at higher accuracy according to the traffic information such as information relating to traffic congestion.

Further, the calculation unit 23 may calculate the consumption electric power amount by using the geographical information being information relating to geographical features. With this, the calculation unit 23 is capable of calculating the consumption electric power amount at higher accuracy according to the geographical information such as information relating to a gradient.

Further, the retrieval unit 22 may retrieve the route by using the disaster information being information relating to an impassable location due to a disaster, and may retrieve a route that does not involve an impassable location. With this, the possibility that vehicle allocation based on the vehicle allocation information cannot be achieved due to an impassable location can be reduced.

Further, the acquisition unit 21 may acquire the vehicle location information, the current electric power amount information, and the disaster information again after the vehicle allocation information is output. In this state, when the disaster information is changed from the disaster information that is previously acquired, the retrieval unit 22 retrieves the route, based on the disaster information that is newly acquired and the vehicle location information. Further, the calculation unit 23 calculates the suppliable electric power amount, based on the route that is newly retrieved and the current electric power amount information that is newly acquired. Further, the output unit 24 outputs the vehicle allocation information, based on the suppliable electric power amount that is newly calculated. With this, the vehicle allocation information can be updated according to change in the disaster information.

Further, when a plurality of electric power supply destinations are present, the output unit 24 generates a vehicle allocation pattern that satisfies the required electric power amount at all the electric power supply destinations.

Further, when there is no vehicle allocation pattern in which the total amount of the suppliable electric power amount of the vehicle to be allocated is equal to or greater than the required electric power amount required at the electric power supply destination, the output unit 24 outputs the information relating to the vehicle allocation pattern in which the consumption electric power amount is minimized as the vehicle allocation information, the vehicle allocation pattern being a vehicle allocation pattern in which a total amount of an electric power amount being a shortfall to the required electric power amount is minimized. With this, the consumption electric power amount can be reduced while minimizing a total amount of a shortfall electric power amount.

Further, the acquisition unit 21 may acquire the vehicle location information, the current electric power amount information, and the required electric power amount information again after the vehicle allocation information is output. In this state, when the required electric power amount information is changed from the required electric power amount information that is previously acquired, the retrieval unit 22 retrieves the route, based on the vehicle location information that is newly acquired. Further, the calculation unit 23 calculates the suppliable electric power amount, based on the route that is newly retrieved, the current electric power amount information that is newly acquired, and the required electric power amount information. Further, the output unit 24 outputs the vehicle allocation information, based on the suppliable electric power amount that is newly calculated. With this, the vehicle allocation information can be updated according to change in the required electric power amount.

[Hardware Configuration Example]

Description is made on a configuration example of hardware resources for achieving the above-mentioned vehicle allocation information output apparatus (10, 20) of each of the exemplary embodiments of the present invention by using one information processing apparatus (computer). The vehicle allocation information output apparatus may be achieved physically or functionally by using at least two information processing apparatuses. Further, the vehicle allocation information output apparatus may be achieved as a dedicated apparatus. Further, only some of the functions of the vehicle allocation information output apparatus may be achieved by using the information processing apparatus.

Figure 15:
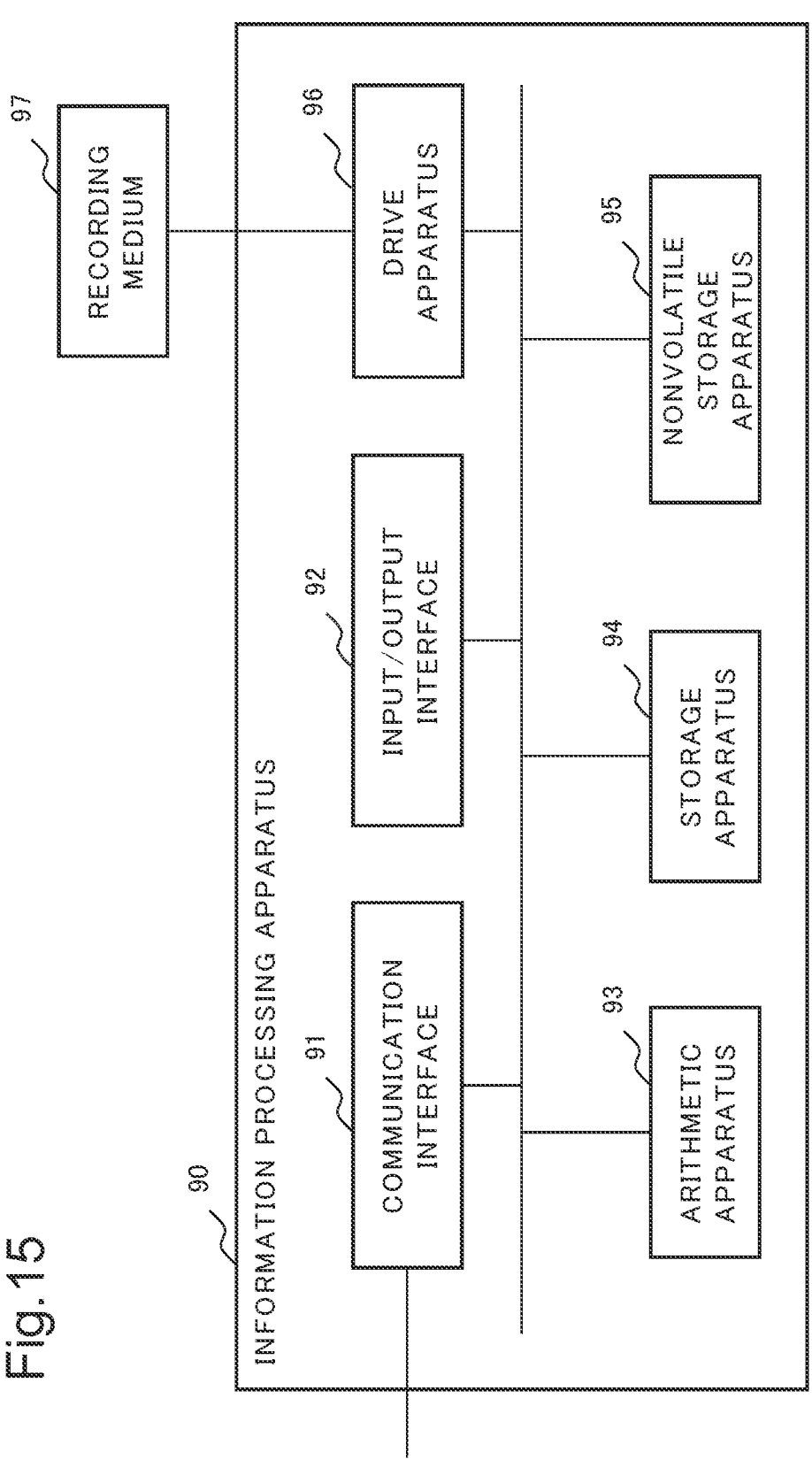
FIG. 15 is a diagram illustrating a hardware configuration example of each of the example embodiments of the present invention.

FIG. 15 is a diagram schematically illustrating a hardware configuration example of an information processing apparatus capable of achieving the vehicle allocation information output apparatus of each of the exemplary embodiments of the present invention. An information processing apparatus 90 includes a communication interface 91, an input/output interface 92, an arithmetic apparatus 93, a storage apparatus 94, a nonvolatile storage apparatus 95, and a drive apparatus 96.

For example, the acquisition unit 11 and the output unit 14 in FIG. 1 can be achieved by the communication interface 91 and the arithmetic apparatus 93. The retrieval unit 12 and the calculation unit 13 can be achieved by the arithmetic apparatus 93.

The communication interface 91 is a communication means for causing the vehicle allocation information output apparatus of each of the exemplary embodiments to communicate with an external apparatus in a wired and/or wireless manner. When the vehicle allocation information output apparatus is achieved by using at least two information processing apparatuses, those apparatuses may be connected to each other in a communicable manner via the communication interface 91.

The input/output interface 92 is a human machine interface including a keyboard being an example of an input device, a display being an output device, and the like.

The arithmetic apparatus 93 is achieved by an arithmetic processing apparatus such as a general central processing unit (CPU) and a microprocessor and a plurality of electric circuits. For example, the arithmetic apparatus 93 is capable of reading various programs stored in the nonvolatile storage apparatus 95 into the storage apparatus 94 and executing processing according to the read program.

The storage apparatus 94 is a memory apparatus such as a random access memory (RAM) to which the arithmetic apparatus 93 can refer, and stores a program, various data, and the like. The storage apparatus 94 may be a volatile memory apparatus.

For example, the nonvolatile storage apparatus 95 is a nonvolatile storage apparatus such as a read only memory (ROM) and a flash memory, and is capable of storing various programs, data, and the like.

The drive apparatus 96 is an apparatus that execute processing of reading and writing data with respect to a recording medium 97, which is described later, for example.

For example, the recording medium 97 is a freely selected recording medium capable of recording data, such as an optical disk, a magneto-optical disk, and a semi-conductor flash memory.

For example, each of the exemplary embodiments of the present invention may be achieved by configuring the vehicle allocation information output apparatus by the information processing apparatus 90 illustrated in FIG. 15 and supplying a program for achieving the functions described in each of the above-mentioned exemplary embodiments to the vehicle allocation information output apparatus.

In this case, the program supplied to the vehicle allocation information output apparatus is executed by the arithmetic apparatus 93, and thus the exemplary embodiments can be achieved. Further, some of the functions instead of all the functions of the vehicle allocation information output apparatus may be configured by the information processing apparatus 90.

Moreover, the above-mentioned program is stored in the recording medium 97, and the vehicle allocation information output apparatus may be configured in such a way that the above-mentioned program is stored as appropriate in the nonvolatile storage apparatus 95 at the time of shipping or operating the vehicle allocation information output apparatus. In this case, as the method of supplying the above-mentioned program, there may be adopted a method of installing the program in the vehicle allocation information output apparatus by using an appropriate jig at the time of manufacturing before shipping or at the time of operation. Further, as the method of supplying the above-mentioned program, there may be adopted a general procedure such as a method of downloading the program from the outside via a communication line such as the Internet.

The whole or part of the example embodiments disclosed above can be described as, but not limited to, the following supplementary notes.

(Supplementary Note 1)

A vehicle allocation information output apparatus relating to a vehicle capable of supplying electric power to an electric power supply destination and being for outputting vehicle allocation information being information relating to the vehicle to be allocated to the electric power supply destination, the vehicle allocation information output apparatus comprising:

an acquisition unit configured to acquire vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

a retrieval unit configured to retrieve a route from the current location of the vehicle to the electric power supply destination, based on the vehicle location information and the supply destination location information;

a calculation unit configured to calculate a suppliable electric power amount of the vehicle on arrival at the electric power supply destination for the route being retrieved, based on the current electric power amount and a consumption electric power amount to be consumed when the vehicle travels to the electric power supply destination via the route; and an output unit configured to output information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

(Supplementary Note 2)

The vehicle allocation information output apparatus according to Supplementary note 1, wherein the output unit transmits the vehicle allocation information to the vehicle to be allocated, and, for the vehicle to be allocated, the vehicle allocation information includes information relating to the electric power supply destination being a vehicle allocation destination of the vehicle.

(Supplementary Note 3)

The vehicle allocation information output apparatus according to Supplementary note 1 or 2, wherein the vehicle allocation information includes information relating to the route in a vehicle allocation pattern whose information is output as the vehicle allocation information.

(Supplementary Note 4)

The vehicle allocation information output apparatus according to any one of Supplementary notes 1 to 3, wherein the calculation unit calculates the consumption electric power amount by using information relating to an electric power amount to be consumed when the vehicle travels for a unit time.

(Supplementary Note 5)

The vehicle allocation information output apparatus according to any one of Supplementary notes 1 to 4, wherein the calculation unit calculates the consumption electric power amount by using traffic information being information relating to a traffic.

(Supplementary Note 6)

The vehicle allocation information output apparatus according to any one of Supplementary notes 1 to 5, wherein the calculation unit calculates the consumption electric power amount by using geographical information being information relating to geographical features.

(Supplementary Note 7)

The vehicle allocation information output apparatus according to any one of Supplementary notes 1 to 6, wherein the retrieval unit retrieves the route that does not involve an impassable location by using disaster information being information relating to the impassable location due to a disaster.

(Supplementary note 8)

The vehicle allocation information output apparatus according to Supplementary note 7, wherein, after the vehicle allocation information is output, the acquisition unit acquires the vehicle location information, the current electric power amount information, and the disaster information again, when the disaster information is changed from the disaster information that is previously acquired, the retrieval unit retrieves the route, based on the disaster information and the vehicle location information that are newly acquired, the calculation unit calculates the suppliable electric power amount, based on the route that is newly retrieved and the current electric power amount information that is newly acquired, and the output unit outputs the vehicle allocation information, based on the suppliable electric power amount that is newly calculated.

(Supplementary Note 9)

The vehicle allocation information output apparatus according to any one of Supplementary notes 1 to 8, wherein, when there are a plurality of the electric power supply destinations, the output unit generates a vehicle allocation pattern that satisfies the required electric power amount for all the electric power supply destinations.

(Supplementary Note 10)

The vehicle allocation information output apparatus according to any one of Supplementary notes 1 to 9, wherein, when there is no vehicle allocation pattern in which a total amount of the suppliable electric power amount of the vehicle to be allocated is equal to or greater than a required electric power amount being required at the electric power supply destination, the output unit outputs information relating to a vehicle allocation pattern in which the consumption electric power amount is minimized as the vehicle allocation information, the vehicle allocation pattern being a vehicle allocation pattern in which a total amount of an electric power amount being a shortfall to the required electric power amount is minimized.

(Supplementary Note 11)

The vehicle allocation information output apparatus according to any one of Supplementary notes 1 to 10, wherein, after the vehicle allocation information is output, the acquisition unit acquires the vehicle location information, the current electric power amount information, and the required electric power amount information again, when the required electric power amount information is changed from the required electric power amount information that is previously acquired, the retrieval unit retrieves the route, based on the vehicle location information that is newly acquired, the calculation unit calculates the suppliable electric power amount, based on the route that is newly retrieved and the current electric power amount information and the required electric power amount information that are newly acquired, and the output unit outputs the vehicle allocation information, based on the suppliable electric power amount that is newly calculated.

(Supplementary Note 12)

A vehicle allocation information output system relating to a vehicle capable of supplying electric power to an electric power supply destination and being configured to output vehicle allocation information being information relating to the vehicle to be allocated to the electric power supply destination, the vehicle allocation information output system comprising:

an acquisition means for acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

a retrieval means for retrieving a route from the current location of the vehicle to the electric power supply destination, based on the vehicle location information and the supply destination location information;

a calculation means for calculating a suppliable electric power amount of the vehicle on arrival at the electric power supply destination for the route being retrieved, based on the current electric power amount and a consumption electric power amount to be consumed when the vehicle travels to the electric power supply destination via the route; and an output means for outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

(Supplementary Note 13)

A vehicle allocation information output method relating to a vehicle capable of supplying electric power to an electric power supply destination and being for outputting vehicle allocation information being information relating to the vehicle to be allocated to the electric power supply destination, the vehicle allocation information output method comprising:

acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

retrieving a route from the current location of the vehicle to the electric power supply destination, based on the vehicle location information and the supply destination location information;

calculating a suppliable electric power amount of the vehicle on arrival at the electric power supply destination for the route being retrieved, based on the current electric power amount and a consumption electric power amount to be consumed when the vehicle travels to the electric power supply destination via the route; and outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

(Supplementary Note 14)

A non-transitory computer-readable recording medium recording a vehicle allocation information output program relating to a vehicle capable of supplying electric power to an electric power supply destination and being for outputting vehicle allocation information being information relating to the vehicle to be allocated to the electric power supply destination, the vehicle allocation information output program causing a computer to achieve:

an acquisition function of acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

a retrieval function of retrieving a route from the current location of the vehicle to the electric power supply destination, based on the vehicle location information and the supply destination location information;

a calculation function of calculating a suppliable electric power amount of the vehicle on arrival at the electric power supply destination for the route being retrieved, based on the current electric power amount and a consumption electric power amount to be consumed when the vehicle travels to the electric power supply destination via the route; and an output function of outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A vehicle allocation information output apparatus relating to a vehicle capable of supplying electric power to an electric power supply destination and being for outputting vehicle allocation information being information relating to the vehicle to be allocated to the electric power supply destination, the vehicle allocation information output apparatus comprising one or more memories storing instructions and one or more processors configured to execute the instructions to:

acquire vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

retrieve a route from the current location of the vehicle to the electric power supply destination, based on the vehicle location information and the supply destination location information;

calculate a suppliable electric power amount of the vehicle on arrival at the electric power supply destination for the route being retrieved, based on the current electric power amount and a consumption electric power amount to be consumed when the vehicle travels to the electric power supply destination via the route; and output information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

2. The vehicle allocation information output apparatus according to claim 1, wherein the one or more processors are configured to execute the instructions to transmit the vehicle allocation information to the vehicle to be allocated, and, for the vehicle to be allocated, the vehicle allocation information includes information relating to the electric power supply destination being a vehicle allocation destination of the vehicle.

3. The vehicle allocation information output apparatus according to claim 1, wherein the vehicle allocation information includes information relating to the route in a vehicle allocation pattern whose information is output as the vehicle allocation information.

4. The vehicle allocation information output apparatus according to claim 1, wherein the one or more processors are configured to execute the instructions to calculate the consumption electric power amount by using information relating to an electric power amount to be consumed when the vehicle travels for a unit time.

5. The vehicle allocation information output apparatus according to claim 1, wherein the one or more processors are configured to execute the instructions to calculate the consumption electric power amount by using traffic information being information relating to a traffic.

6. The vehicle allocation information output apparatus according to claim 1, wherein the one or more processors are configured to execute the instructions to calculate the consumption electric power amount by using geographical information being information relating to geographical features.

7. The vehicle allocation information output apparatus according to claim 1, wherein the one or more processors are configured to execute the instructions to retrieve the route that does not involve an impassable location by using disaster information being information relating to the impassable location due to a disaster.

8. The vehicle allocation information output apparatus according to claim 7, wherein the one or more processors are configured to execute the instructions to:

after the vehicle allocation information is output, acquire the vehicle location information, the current electric power amount information, and the disaster information again;

when the disaster information is changed from the disaster information that is previously acquired, retrieve the route, based on the disaster information and the vehicle location information that are newly acquired;

calculate the suppliable electric power amount, based on the route that is newly retrieved and the current electric power amount information that is newly acquired; and output the vehicle allocation information, based on the suppliable electric power amount that is newly calculated.

9. The vehicle allocation information output apparatus according to claim 1, wherein, when there are a plurality of the electric power supply destinations, the one or more processors are configured to execute the instructions to generate a vehicle allocation pattern that satisfies the required electric power amount for all the electric power supply destinations.

10. The vehicle allocation information output apparatus according to claim 1, wherein, when there is no vehicle allocation pattern in which a total amount of the suppliable electric power amount of the vehicle to be allocated is equal to or greater than a required electric power amount being required at the electric power supply destination, the one or more processors are configured to execute the instructions to output information relating to a vehicle allocation pattern in which the consumption electric power amount is minimized as the vehicle allocation information, the vehicle allocation pattern being a vehicle allocation pattern in which a total amount of an electric power amount being a shortfall to the required electric power amount is minimized.

11. The vehicle allocation information output apparatus according to claim 1, wherein the one or more processors are configured to execute the instructions to:

after the vehicle allocation information is output, acquire the vehicle location information, the current electric power amount information, and the required electric power amount information again;

when the required electric power amount information is changed from the required electric power amount information that is previously acquired, retrieve the route, based on the vehicle location information that is newly acquired;

calculate the suppliable electric power amount, based on the route that is newly retrieved and the current electric power amount information and the required electric power amount information that are newly acquired; and output the vehicle allocation information, based on the suppliable electric power amount that is newly calculated.

12. A vehicle allocation information output method relating to a vehicle capable of supplying electric power to an electric power supply destination and being for outputting vehicle allocation information being information relating to the vehicle to be allocated to the electric power supply destination, the vehicle allocation information output method comprising:

acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

retrieving a route from the current location of the vehicle to the electric power supply destination, based on the vehicle location information and the supply destination location information;

calculating a suppliable electric power amount of the vehicle on arrival at the electric power supply destination for the route being retrieved, based on the current electric power amount and a consumption electric power amount to be consumed when the vehicle travels to the electric power supply destination via the route; and outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

13. A non-transitory computer-readable recording medium recording a vehicle allocation information output program relating to a vehicle capable of supplying electric power to an electric power supply destination and being for outputting vehicle allocation information being information relating to the vehicle to be allocated to the electric power supply destination, the vehicle allocation information output program causing a computer to achieve:

an acquisition function of acquiring vehicle location information being information relating to a current location of the vehicle, current electric power amount information being information relating to a current electric power amount of the vehicle, supply destination location information being location information relating to the electric power supply destination, and information relating to a required electric power amount being required at the electric power supply destination;

a retrieval function of retrieving a route from the current location of the vehicle to the electric power supply destination, based on the vehicle location information and the supply destination location information;

a calculation function of calculating a suppliable electric power amount of the vehicle on arrival at the electric power supply destination for the route being retrieved, based on the current electric power amount and a consumption electric power amount to be consumed when the vehicle travels to the electric power supply destination via the route; and an output function of outputting information relating to a vehicle allocation pattern in which the consumption electric power amount is minimized as the vehicle allocation information, the vehicle allocation pattern being a vehicle allocation pattern being a candidate of a combination of the electric power supply destination and the vehicle to be allocated to the electric power supply destination and being a vehicle allocation pattern in which a total amount of the suppliable electric power amount of the vehicle to be allocated is equal to or greater than a required electric power amount at the electric power supply destination.

\* \* \* \* \*